US008409670B2

(12) United States Patent
Mori et al.

(10) Patent No.: US 8,409,670 B2
(45) Date of Patent: Apr. 2, 2013

(54) PROCESS FOR PRODUCING PHOTOCHROMIC LAYERED PRODUCT

(75) Inventors: Katsuhiro Mori, Yamaguchi (JP); Hironobu Nagoh, Yamaguchi (JP); Junji Momoda, Yamaguchi (JP); Shinobu Izumi, Yamaguchi (JP)

(73) Assignee: Tokuyama Corporation (JP)

( * ) Notice: Subject to any disclaimer, the term of this patent is extended or adjusted under 35 U.S.C. 154(b) by 1364 days.

(21) Appl. No.: 10/486,373

(22) PCT Filed: May 26, 2003

(86) PCT No.: PCT/JP03/06525
§ 371 (c)(1),
(2), (4) Date: Jul. 6, 2004

(87) PCT Pub. No.: WO03/099550
PCT Pub. Date: Dec. 4, 2003

(65) Prior Publication Data
US 2007/0065633 A1   Mar. 22, 2007

(30) Foreign Application Priority Data
May 27, 2002 (JP) ................................. 2002-152551

(51) Int. Cl.
*C08F 2/48* (2006.01)
(52) U.S. Cl. ........................................ 427/508; 427/512
(58) Field of Classification Search ............ 427/508, 427/512, 517, 553
See application file for complete search history.

(56) References Cited

U.S. PATENT DOCUMENTS

| | | | | |
|---|---|---|---|---|
| 4,873,029 A * | 10/1989 | Blum | ............................ | 264/1.32 |
| 5,076,974 A * | 12/1991 | Modrek et al. | ................ | 264/401 |
| 5,175,030 A * | 12/1992 | Lu et al. | ........................... | 428/30 |
| 5,187,041 A * | 2/1993 | Mouri et al. | ................... | 430/201 |
| 5,531,940 A * | 7/1996 | Gupta et al. | ..................... | 264/1.7 |
| 5,770,259 A * | 6/1998 | Parker et al. | ..................... | 427/164 |
| 5,910,516 A * | 6/1999 | Imura et al. | ...................... | 522/39 |
| 6,602,603 B2 * | 8/2003 | Welch et al. | ................... | 428/412 |

FOREIGN PATENT DOCUMENTS

| | | | |
|---|---|---|---|
| JP | 59038239 A | * | 3/1984 |
| JP | 63066234 A | * | 3/1988 |
| JP | 06-148766 | | 5/1994 |
| JP | 09-001716 | | 1/1997 |
| JP | 09001716 A | * | 1/1997 |
| JP | 2000279869 A | * | 10/2000 |

* cited by examiner

*Primary Examiner* — Elena T Lightfoot
(74) *Attorney, Agent, or Firm* — H. Jay Spiegel

(57) ABSTRACT

A method of producing a laminate comprising preparing a substrate having curved surfaces; applying a photopolymerizable and curable composition containing a photochromic compound and a phosphorus-containing photopolymerization initiator onto the curved surfaces of the base member; and curing the photopolymerizable and curable composition by the irradiation with an active energy ray having a relative intensity profile of 0 to 5% of wavelength components of not shorter than 200 nm but shorter than 300 nm, 25 to 75% of wavelength components of not shorter than 300 nm but shorter than 400 nm and 25 to 75% of wavelength components of not shorter than 400 nm but not longer than 500 nm while maintaining the substrate at not higher than 100° C. This method makes it possible to form a homogeneous and thin film containing a photochromic compound at a high concentration and having a uniform thickness on the substrate having a curved surface, such as a spectacle lens that is generally available, and to impart photochromic properties while maintaining excellent mechanical and optical properties of the substrate.

12 Claims, 1 Drawing Sheet

PROCESS FOR PRODUCING PHOTOCHROMIC LAYERED PRODUCT

TECHNICAL FIELD

The present invention relates to a method of producing a laminate with a high molecular weight film that exhibits photochromic properties. More specifically, the invention relates to a method of producing a laminate that is used as an optical article having photochromic properties, such as photochromic spectacle lenses, a photopolymerizable and curable composition preferably used as a coating agent for forming a high molecular weight film in the above method of production, and to a laminate that is preferably used as an optical article produced by the above method of production.

BACKGROUND ART

Photochromism is a reversible action of a compound which quickly changes its color when it is irradiated with light containing ultraviolet rays such as sunlight or light of a mercury lamp and resumes its initial color when it is no longer irradiated with light and is placed in a dark place, and has been applied for a variety of uses.

For example, photochromism has been applied in a field of spectacle lenses, too, and plastic lenses having photochromic properties are obtained by curing polymerizable monomers to which have been added various photochromic compounds having the above-mentioned properties. As photochromic compounds that can be favorably used for such applications, there have been used fulgimide compounds, spirooxazine compounds and chromene compounds.

To produce plastic lenses having photochromic properties, there have been proposed:

① a method (imbibition method) of imbibing the surface of a lens (without photochromic property) with a photochromic compound;

② a method (in mass method) of directly obtaining a photochromic lens by dissolving a photochromic compound in a monomer which is, then, polymerized; and ③ a method (coating method) of forming a layer having photochromic properties on the surfaces of a lens.

To obtain favorable photochromic properties by the above imbibition method ① or the in mass method ②, however, the substrates of lenses must be so designed that favorable photochromic properties are exhibited, and limitation is imposed on the substrates for lenses that can be used. For example, it is contrived to lower the glass transition temperature (Tg) of the substrate of lenses based on such a design policy that the molecules of the photochromic compound are permitted to easily move even in high molecules, or free spaces in the high molecules are expanded so that the molecules of the photochromic compounds are allowed to easily move.

As a monomer for forming a substrate of lenses, for example, U.S. Pat. No. 5,739,243 teaches use of a particular long-chain alkylene glycol dimethacrylate in combination with a polyfunctional methacrylate having three or more radically polymerizable groups. This method makes it possible to obtain a photochromic lens having relatively excellent color density and fading rate. According to this method, however, the glass transition temperature Tg of the substrate is lowered to improve photochromic properties and to improve properties of the substrate for being imbibed with a photochromic compound. As a result, the substrate becomes too soft newly arousing such problems as a decrease in the hardness of the substrate, a decrease in the heat resistance and large optical strain. The above problem can be solved by contriving a monomer and a photochromic material for obtaining a substrate of plastic lenses (see, for example, PCT International Patent Publication 01/05854). So far as the above method ① or ② is employed, however, some limitations are inevitably imposed on the substrate.

According to the above coating method ③, on the other hand, it is allowed to impart photochromic properties to the substrate of lenses that has been generally used without any limitation. When the coating method is employed, however, a technology has not yet been established for forming a coating film having a small and homogeneous thickness that will not adversely affect the properties of the substrate, having a sufficiently high surface hardness and, further, having good photochromic properties.

For example, WO98/37115 is proposing a method of coating the surfaces of a lens with a coating solution obtained by dissolving a photochromic compound in an urethane oligomer, followed by curing. However, a resin obtained by curing the urethane oligomer has a low crosslinking density causing the photochromic property to vary to a large extent depending upon the temperature and, further, involving such a defect that a photochromic compound elutes into the solution of a hard coating material when the hard coating material is being applied onto the photochromic coating layer.

U.S. Pat. No. 5,914,174 proposes a method of obtaining a photochromic lens having a high molecular weight photochromic film laminated on the convex surfaces of a general lens by dissolving a photochromic compound in a polymerizable composition containing monofunctional, bifunctional and polyfunctional radically polymerizable monomers, flowing the polymerizable composition into a cavity between a plastic lens and a glass mold held by an elastomer gasket or a spacer, and polymerizing the polymerizable composition. According to this method, however, the thickness of the obtained photochromic high molecular weight film (coating) becomes as large as 200 to 500 μm, and the strength of the high molecular weight film is reflected on the plastic lens.

That is, the strength of the photochromic lens is low as compared to the strengths of general lenses without having a high molecular weight film. According to this method, further, it is difficult to maintain small and constant the cavity between the plastic lens and the glass mold and is, hence, difficult to form a high molecular weight film having a small and uniform thickness. This tendency becomes conspicuous particularly when the lens surfaces have a complex shape.

Further WO01/02449 proposes a method of obtaining a photochromic lens having a photochromic high molecular weight film of a thickness of about 20 μm formed on the convex surfaces of a general lens by dissolving 5 to 10 parts by weight of a photochromic compound in a polymerizable composition of a combination of two or more kinds of bifunctional (meth)acrylic monomers, applying the polymerizable composition onto the convex surfaces of the lens by spin-coating, and photopolymerizing the lens that is applied by the substitution in a nitrogen atmosphere. According to this method, the surfaces of the lens are coated with a photochromic film that develops color sufficiently densely maintaining a thickness (about 20 μm) that will not adversely affect the properties of the substrate. However, the above publication is considering none of the uniformity of thickness or homogeneity of the coating film, or the optical properties of the obtained lenses.

Generally, a photopolymerization initiator and a photochromic compound are both excited with ultraviolet rays. When light is irradiated under a condition where both of them exist together, therefore, the photopolymerization initiator is minimally decomposed and the polymerization does not easily take place. By using a polymerizable and curable composition containing a photochromic compound and a photopolymerization initiator, therefore, the present inventors have studied the effect of the film-forming conditions upon the coating film. As a result, there were found the following problems involved in the coating method.

(i) When an extended period of time is spent by the polymerization, the surface of the substrate on where the film is to be formed loses flatness. When the lens has curved surfaces like spectacle lenses, the coating agent drips making it difficult to obtain a film having a uniform thickness.

(ii) When the ultraviolet ray is continuously irradiated for extended periods of time under a condition where the polymerization is not taking place to a sufficient degree, the radical reaction is interrupted being affected by oxygen contained in very small amounts in the atmosphere despite the atmosphere is substituted with nitrogen. In particular, an unpolymerized layer is formed near the surface and a film having a sufficiently large surface hardness is not obtained.

(iii) The irradiation with ultraviolet rays for extended periods of time in a state where the polymerization is not taking place to a sufficient degree causes the photochromic compound to be deteriorated due to photo oxidation.

(iv) When irradiated with active energy rays containing intense ultraviolet rays to shorten the time of light irradiation while promoting the polymerization, the surface of the lens is heated at high temperatures at the time of curing (e.g., 120° C. or higher, or 200° C. or higher) being affected by the heat from the source of light and by infrared rays. When a substrate of plastic lenses having low heat resistance is used, therefore, the lens itself is thermally deformed.

(v) A difference occurs in the contraction due to a difference in the polymerizing rate between the surface of the coating and the interior thereof, making it difficult to obtain a homogeneous high molecular weight film.

DISCLOSURE OF THE INVENTION

As described above, the coating method is an excellent method capable of imparting photochromic property to any substrate, but is not still satisfactory in regard to forming a thin coating film having uniform thickness on the curved surfaces of the substrate so as not to impair the properties (particularly, mechanical properties and optical properties) of the substrate, having a homogeneous and high surface hardness and excellent photochromic properties.

It is therefore an object of the present invention to provide a technology capable of forming the above-mentioned coating film.

In order to solve the above problems, the present inventors have conducted keen study, have discovered the fact that a photochromic coating featuring high homogeneity that could not be accomplished by the prior art, is obtained when a photopolymerizable and curable composition containing a photochromic compound at a high concentration is applied onto a substrate having curved surfaces, and is cured by being irradiated with active energy rays having a particular relative intensity profile (relative intensity profile of wavelength components) while maintaining the substrate at not higher than a particular temperature, and have thus finished the invention.

Namely, according to the present invention, there is provided a method of producing a laminate comprising:

preparing a substrate having curved surface;

applying a photopolymerizable and curable composition containing a photochromic compound and a phosphorus-containing photopolymerization initiator onto the curved surfaces of the substrate; and curing the photopolymerizable and curable composition by the irradiation with an active energy ray having a relative intensity profile of 25 to 75% of wavelength components of not shorter than 400 but not longer than 500 nm, 25 to 75% of wavelength components of not shorter than 300 nm but shorter than 400 nm, and 0 to 5% of wavelength components of not shorter than 200 nm but shorter than 300 nm while maintaining the substrate at not higher than 100° C.

According to the above production method of the present invention, the photopolymerizable and curable composition is cured in a gaseous atmosphere (i.e., in an open system) without using mold to enhance the productivity. When the mold is used, the mold must be the one that is specifically designed and, besides, it is difficult to precisely form a thin film having a thickness of 1 to 100 μm and, particularly, 1 to 50 μm.

In the present invention, further, the photopolymerizable and curable composition containing the photochromic compound is blended with a phosphorus-containing photopolymerization initiator as a photopolymerization initiator. Upon effecting the curing by the irradiation with the active energy ray which is so adjusted that the relative intensity thereof exhibits the above profile, the curing is completed within short periods of time while effectively suppressing the photochromic compound contained in large amounts in the curable composition from being deteriorated by light, and a high molecular weight film is homogeneously formed on the curved surfaces of the substrate. That is, the phosphorus-containing photopolymerization initiator generally reacts not only with the ultraviolet rays but also with active energy rays of wavelengths in a visible light region of not shorter than 400 nm to undergo the cleavage thereby to initiate the radical polymerization reaction. Even when the photopolymerizable and curable composition is blended with the photochromic compound at a high concentration, therefore, the radical polymerization reaction is initiated by the irradiation with active energy rays of which the relative intensity profile is adjusted as described above so as to have a decreased relative intensity in the region of ultraviolet rays where the photochromic compound is excited without, therefore, affecting the photochromic compound. Therefore, the polymerization and curing are quickly effected up to the interior of the coated layer of the photopolymerizable and curable composition while effectively avoiding the photochromic compound from being deteriorated by light. After cleaved, further, the phosphorus-containing polymerization initiator does not absorb visible light due to its own photo-bleaching effect and, hence, triggers the initiation reaction successively even in the direction of depth of the coated layer, so that the coated layer is homogeneously cured even up to the interior thereof.

Here, the relative intensity of the active energy ray stands for a ratio of area intensities of the active energy rays in the wavelength regions of when the total area intensity of the active energy rays of the region of 200 to 500 nm is regarded to be 100%. The relative intensity profile of the active energy rays can be easily adjusted by permitting the active energy rays containing ultraviolet rays to pass through a filter (e.g., hard soda glass) that works to decrease the wavelength components of shorter than 300 nm.

According to the production method of the present invention as described above, the photochromic compound is effectively avoided from being deteriorated by light, and is quickly and homogeneously cured up to the interior, making it possible to effectively avoid the dropping of the curable composition that is applied onto the substrate and, hence, to form, on the surfaces of the substrate, a photochromic high molecular weight film featuring uniform thickness and containing the photochromic compound at a high concentration.

According to the present invention, further, it is desired to use a photopolymerization initiator other than the phosphorus-containing photopolymerization initiator together with the phosphorus-containing photopolymerization initiator. That is, the above-mentioned phosphorus-containing photopolymerization initiator works as an interior curing polymerization initiator while the other photopolymerization initiators trigger the initiation reaction with ultraviolet rays. Near the surface of the coated layer of the curable composition, therefore, the other photopolymerization initiators are little affected by oxygen and work as surface-curable polymerization initiators. That is, even when the curing is conducted in an atmosphere containing oxygen in trace amounts (several tens to several hundreds of ppm), use of the phosphorus-containing photopolymerization initiator together with other photopolymerization initiators makes it possible to form a photochromic high molecular film which is homogeneously cured up to the interior from the surface. In other words, the allowable range of oxygen concentration is expanded in an atmosphere where the polymerization and curing are conducted. As a result, the atmosphere such as substitution with nitrogen can be adjusted under mild conditions, the polymerization and curing can be completed within short periods of time, and the curable composition applied onto the substrate is effectively avoided from dripping, which is very advantageous for preventing the occurrence of dispersion in the thickness of the photochromic high molecular weight film and the occurrence of wrinkles. Besides, the high molecular weight film exhibits an enhanced surface hardness, which is advantageous for enhancing the intimate adhesion between the high molecular film and the substrate or the hard coated layer.

When other photopolymerization initiators only are used in the present invention without using the phosphorus-containing photopolymerization initiator, the interior of the coated layer is not almost cured provided the curable composition contains the photochromic compound at a high concentration. In order for the coated layer to be cured up to the interior, the other photopolymerization initiators must be used in large amounts. As a result, the photochromic compound is deteriorated.

In the present invention, further, the curing is conducted while maintaining the substrate at a temperature of not higher than 100° C. Therefore, a photochromic high molecular weight film is formed maintaining a uniform thickness effectively preventing the substrate from being thermally deformed. Even when there is used a thin substrate (e.g., thin lens) having a thickness of, for example, not larger than 2 mm at the center of curvature of the curved surface, the photochromic high molecular weight film can be formed without being deformed. In order to maintain the temperature of the substrate at not higher than 100° C., it is desired that the active energy rays are passed through a heat ray cut filter after their relative intensity profile has been adjusted.

In the present invention, the photopolymerizable and curable composition used for the production of the photochromic laminate comprises (A) a radically polymerizable monomer, (B) a photochromic compound and (C) a photopolymerization initiator component, wherein the photochromic compound (B) is contained in an amount of 0.2 to 2.0% by weight, and the photopolymerization initiator component (C) being contained therein comprises a phosphorus-containing photopolymerization initiator in an amount of 0.01 to 10 parts by weight and photopolymerization initiators other than the phosphorus-containing photopolymerization initiator in amounts of 0.01 to 10 parts by weight per 100 parts by weight of the radically polymerizable monomer (A).

According to the above production method of the present invention, there is obtained a laminate comprising a substrate having curved surfaces, and a high molecular weight film having a thickness of 1 to 100 μm formed on the curved surfaces of the substrate and containing 0.2 to 20% by weight of a photochromic compound, wherein a difference between a spherical refractive power on the curved surface of the substrate of before the high molecular weight film layer is laminated (hereinafter simply called spherical refractive index of the substrate) and a spherical refractive power on the curved surface on where is formed the high molecular weight film layer of the laminate (hereinafter simply called spherical refractive index of the laminate) is smaller than ±0.5 diopters, and a difference ($\Delta W = W_{max} - W_{av}$ or $W_{av} - W_{min}$) between a maximum film thickness ($W_{max}$) or a minimum film thickness ($W_{min}$) of the region of the high molecular weight film layer except the peripheral edge portions and an average film thickness ($W_{av}$) is not larger than 7% ($\Delta W/W_{av}$ 0.07).

That is, according to the production method of the invention, the curing is effected within short periods of time effectively suppressing the dripping of solution during the curing or inhomogeneous polymerization. It is therefore allowed to form a homogeneous photochromic coating having a uniform thickness on the curved surfaces of the substrate. Accordingly, a difference between the spherical refractive index of the substrate and the spherical refractive power of the laminate becomes smaller than ±0.5 diopters. This means that high optical characteristics possessed by the substrate are maintained without almost being impaired. Besides, despite of being formed on the curved surfaces, the entire high molecular weight film has a uniform thickness. The degree of uniformity of the film thickness is as very high as not larger than 7% of the average film thickness ($\Delta W/W_{av}$ 0.07). It is relatively easy to form a high molecular weight film having a uniform thickness on a plane. With the conventional technology of forming a film by using a coating agent, however, it is not allowed to form a uniform and thin high molecular weight film on the curved surfaces.

Here, the spherical refractive power stands for a refractive power of one surface of a spectacle lens that is used as an index for evaluating the optical characteristics of the spectacle lenses (measured by using, for example, a reflection-type curvature measuring machine FOCOVISION SR-1 manufactured by Automation & Robotics Co.). A spherical refractive power F at an optical central portion of a lens (substrate) placed, for example, in the air (refractive index of 1) is expressed by the following formula, $$F = (n-1)/r1$$

wherein r1 is a radius (m) of curvature of one surface of the lens, and n is a refractive index of the lens.

The spherical refractive power F assumes a positive value in the case of a convex surface and a negative value in the case of a concave surface, the unit thereof being diopter. By measuring the radius of curvature of the curved surface of the high molecular weight film that is formed, therefore, the spherical refractive power of the laminate is calculated from the above formula. Here, however, the thickness of the high molecular weight film is smaller than that of the lens and can be neglected. Therefore, the refractive index n used here is that of the lens.

Further, the spherical refractive power F may be expressed as "an average surface refractive power" by taking into consideration a deviation of the real curved surface of the substrate from the spherical shape, since error stems from the fact that the curved surface of the substrate such as lens is not perfectly spherical. The average surface refractive power is calculated in compliance with the following formula, (Spherical refractive power+cylindrical refractive power)×½

Either the spherical refractive power or the cylindrical refractive power can be measured by using the above reflection-type curvature measuring machine. The allowable diopter value based on the average surface refractive power of the laminate obtained by the invention is equal to the allowable diopter value based on the spherical refractive power (smaller than ±0.5 diopters).

When the high molecular weight film formed on the surface of the substrate contains wrinkles to a degree that can be observed by naked eyes, then, the spherical refractive power cannot be measured. Namely, the surface reactive power that can be measured means that the surface is free of wrinkles that are observable by naked eyes.

Figure 1:
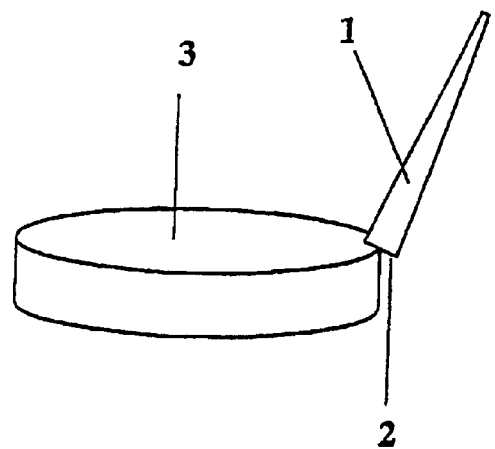
FIG. 1 is a view illustrating a method of applying a photopolymerizable composition that is suited for forming a photochromic coating of a thickness of, for example, not smaller than 10 μm on the curved surfaces of a substrate in the production method of the present invention.

BEST MODE FOR CARRYING OUT THE INVENTION (Substrate)

The substrate on which the photochromic high molecular weight film is to be laminated as used in the present invention has a curved surface, and a high molecular weight film is laminated on the curved surface. The curved surface of the substrate stands for that the surface has a predetermined curvature. Though there is no particular limitation, if expressed by a spherical curvature 1/R, a preferred curvature becomes 1/R=1/0.05 to 1/1 (unit of R is in meters). The curved surface may be formed on one surface of the substrate or on both surfaces of the substrate. When both surfaces of the substrate are curved, the high molecular weight film may be laminated on both curved surfaces. Concrete examples of the substrate having the curved surfaces include a lens of which both surfaces have the same curvature, a double-convex lens, a flat-convex lens, a convex meniscus lens, a double-concave lens and a concave meniscus lens. In particular, there can be preferably used a convex meniscus lens and a concave meniscus lens having the same curvature on both surfaces, that have now been widely used as spectacle lenses. Further, the production method of the invention is capable of effectively preventing the substrate from being thermally deformed. Therefore, the greatest effect is obtained when use is made of a thin substrate having a thickness of not larger than 2 mm at the center of curvature of the curved surface.

There is no particular limitation on the material forming the substrate, and there can be used resins such as (meth)acrylic resin, polycarbonate resin, allyl resin, thiourethane resin, urethane resin, thioepoxy resin, polyethylene terephthalate, polypropylene, polyethylene, polystyrene, epoxy resin, polyvinyl chloride, ethylene polytetrafluoride and silicone resin; metals such as stainless steel (SUS), aluminum, copper and iron; rubbers such as styrene/butadiene rubber, polybutadiene rubber, isoprene rubber and acrylic rubber; as well as any known materials such as semiconductor, lumber, inorganic glass, quartz glass, papers, ceramics and the like. From the standpoint of imparting photochromic properties, however, it is desired to use a substrate having transparency. To produce optical articles such as photochromic lenses, for example, the substrate is preferably a glass or a resin that is usually used as a lens. Plastic spectacle lenses usually have curved surfaces. Owing to the progress in the optical design in recent years, the convex surfaces, in many cases, have complex curved shapes. According to the present invention, however, such spectacle lenses can be used as substrates without any problem.

(Photopolymerizable and Curable Composition)

In the present invention, the photopolymerizable and curable composition used for forming a photochromic high molecular weight film on the curved surface of the substrate comprises (A) a radically polymerizable monomer, (B) a photochromic compound and (C) a photopolymerization initiator component.

(A) Radically Polymerizable Monomers.

There is no particular limitation on the radically polymerizable monomer (A), and there can be used known compounds having a radically polymerizable group such as (meth)acryloyl group, (meth)acryloyloxy group, vinyl group, allyl group or styryl group without any limitation. Among them, it is desired to use a compound having the (meth)acryloyl group or the (meth)acryloyloxy group as a radically polymerizable group from the standpoint of easy availability and curability.

As the radically polymerizable monomer, further, it is desired to use a highly hard monomer and a lowly hard monomer in combination to improve chemical and mechanical properties of the cured body such as resistance against being dissolved in a solvent, hardness and heat resistance, as well as to improve photochromic properties such as color density and fading rate.

The highly hard monomer is the one of which a homopolymer exhibits an L-scale Rockwell hardness of not smaller than 60, and the lowly hard monomer is the one of which a homopolymer exhibits an L-scale Rockwell hardness of not larger than 40. The L-scale Rockwell hardness is measured in compliance with JIS-B 7726. By measuring the homopolymers of the monomers for their L-scale Rockwell hardnesses, it is allowed to easily judge whether it is a highly hard monomer or a lowly hard monomer. Concretely speaking, a cured body of a thickness of 2 mm is obtained by polymerizing the monomer alone, left to stand in a room maintained at 25° C. for one day, and is measured for its L-scale Rockwell hardness by using a Rockwell hardness tester to easily make it sure. Here, however, the polymer that is measured for its L-scale Rockwell hardness must be such that not less than 90% of the polymerizable groups possessed by the monomer that is fed have been polymerized. If not less than 90% of the polymerizable groups have been polymerized, the L-scale Rockwell hardness of the cured body is usually measured as a nearly constant value.

The highly hard monomer works to improve the resistance of the cured material (high molecular weight film) against being dissolved in a solvent, hardness and heat resistance. In order that the above effects are more strikingly exhibited, it is desired to use a highly hard monomer of which the homopolymer exhibits an L-scale Rockwell hardness of 65 to 130.

Such a highly hard monomer is a compound having 2 to 15 and, more desirably, 2 to 6 radically polymerizable groups in a molecule thereof. Its concrete examples include the compounds represented by the formulas (1) to (5) given below. When there is a width in the recurring number assumed by the recurring unit in the main chain of the compounds represented by the following formulas, it is allowed to use a mixture of a plurality of molecules having different recurring numbers as a highly hard monomer.

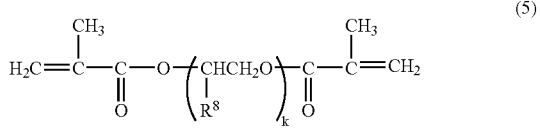

(5)

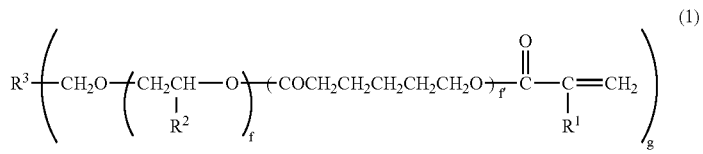

(1)

wherein $R^1$ is a hydrogen atom or a methyl group, $R^2$ is a hydrogen atom, a methyl group or an ethyl group, $R^3$ is an organic residue having a valency of 3 to 6, f is an integer of 0 to 3, f' is an integer of 0 to 3, and g is an integer of 3 to 6,

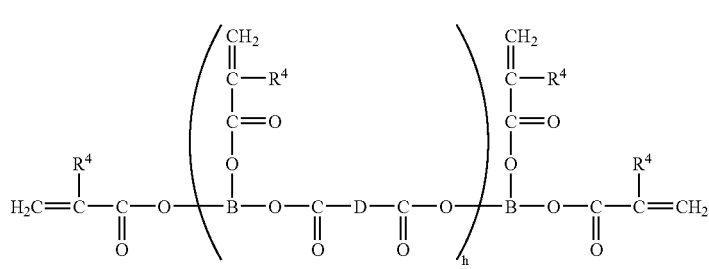

(2)

wherein $R^4$ is a hydrogen atom or a methyl group, B is an organic residue having a valency of 3, D is a divalent organic residue, and h is an integer of 1 to 10,

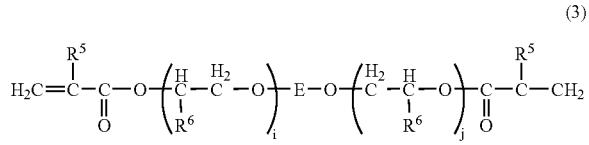

(3)

wherein $R^5$ is a hydrogen atom or a methyl group, $R^6$ is a hydrogen atom, a methyl group, an ethyl group or hydroxyl group, E is a divalent organic residue having a ring, and i and j are positive integers or 0 and are such that an average value of i+j is 0 to 6,

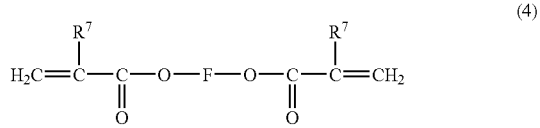

(4)

wherein $R^7$ is a hydrogen atom or a methyl group, and F is an alkylene group that may have a side chain and of which the main chain has 2 to 9 carbon atoms, wherein $R^8$ is a hydrogen atom, a methyl group or an ethyl group, and k is an integer of 1 to 6.

As will be obvious from the above formulas (1) to (5) in which $R^1$, $R^4$, $R^5$ and $R^7$ are hydrogen atoms or methyl groups, the compounds represented by the above formulas are those having 2 to 6 (meth)acryloyloxy groups. When there are a plurality of these groups in one molecule, the plurality of groups may be different from each other. It is, however, desired that the plurality of groups are the same ones (this also holds for $R^{11}$ and $R^{14}$ appearing later) from the standpoint of easy availability.

In the above formula (1), $R^2$ is a hydrogen atom, a methyl group or an ethyl group, and $R^3$ is an organic residue having a valency of 3 to 6. There is no particular limitation on the organic residue, and the main chain may include a bond such as ester bond, ether bond, amide bond, thioether bond, sulfonyl bond or urethane bond other than carbon-carbon bond. In order for the homopolymer to exhibit the L-scale Rockwell hardness of not smaller than 60, $R^3$ is desirably an organic residue having 1 to 30 carbon atoms and, more preferably, an organic residue having 1 to 15 carbon atoms and which may include ether bond and/or urethane bond.

In the formula (1), further, f and f' are, independently from each other, integers of 0 to 3. When f or f' is not smaller than 3, the homopolymer of the monomer tends to exhibit the L-scale Rockwell hardness of not larger than 60. In order for the L-scale Rockwell hardness to be not smaller than 60, further, it is most desired that the sum of f and f' is 0 to 3.

Concrete examples of the highly hard monomer represented by the formula (1) include trimethylolpropane trimethacrylate, trimethylolpropane triacrylate, tetramethylolmethane trimethacrylate, tetramethylolmethane triacrylate, trimethylolpropane trimethacrylate, tetramethylolmethane tetramethacrylate, tetramethylolmethane tetraacrylate, trimethylolpropanetriethylene glycol trimethacrylate, trimethylolpropanetriethylene glygol triacrylate, ethoxylated pentaerythritol tetraacrylate,-ethoxylated pentaerythritol tetramethacrylate, pentaerythritol trimethacrylate, pentaerythritol tetramethacrylate, dipentaerythritol hexaacrylate, urethaneoligomer tetraacrylate, urethaneoligomer hexamethacrylate, urethaneoligomer hexaacrylate, polyesteroligomer hexaacrylate, caprolactone-modified dipentaerythritol hexaacrylate and ditrimethylpropane tetraacrylate.

In the formula (2), B is an organic residue having a valency of 3 and D is a divalent organic residue. There is no particular limitation on the organic residues B and D, and the main chain may include a bond such as ester bond, ether bond, amide bond, thioether bond, sulfonyl bond or urethane bond other than carbon-carbon bond. In order for the homopolymer to exhibit the L-scale Rockwell hardness of not smaller than 60, B is desirably an organic residue derived from straight-chain or branched-chain hydrocarbons having 3 to 10 carbon atoms, and D is desirably an organic residue derived from straight-chain or branched-chain aliphatic hydrocarbons having 1 to 10 carbon atoms or derived from aromatic hydrocarbons having 6 to 10 carbon atoms.

In the compound of the formula (2), it is desired that h is an integer of 1 to 10 and, particularly, an integer of 1 to 6 in order for the homopolymer to exhibit the L-scale Rockwell hardness of not smaller than 60.

Concrete examples of the highly hard monomer represented by the above formula (2) include a tetrafunctional polyester oligomer having a molecular weight of 2,500 to 3,500 (EB80, manufactured by DAICEL UCB COMPANY LTD.), a tetrafunctional polyester oligomer having a molecular weight of 6,000 to 8,000 (EB450, manufactured by DAICEL UCB COMPANY LTD.), a hexafunctional polyester oligomer having a molecular weight of 45,000 to 55,000 (EB1830, manufactured by DAICEL UCB COMPANY LTD.) and a tetrafunctional polyester oligomer having a molecular weight of 10,000 (GX8488B, manufactured by Dai-ichi Kogyo Seiyaku Co., Ltd.).

In the above formula (3), $R^6$ is a hydrogen atom, a methyl group, an ethyl group or a hydroxyl group, and E is a divalent organic residue having a ring. There is no particular limitation on the organic residue E provided it has a ring. Further, the main chain may include a bond such as ester bond, ether bond, amide bond, thioether bond, sulfonyl bond or urethane bond other than carbon-carbon bond. Examples of the ring possessed by the organic residue E include a benzene ring, a cyclohexane ring, an adamantane ring and rings shown below.

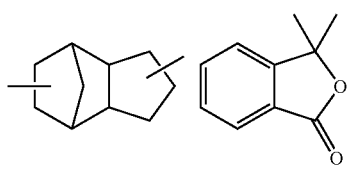

In the present invention, it is desired that the ring possessed by the organic residue E is a benzene ring, and a preferred organic residue E is expressed by the following formula,

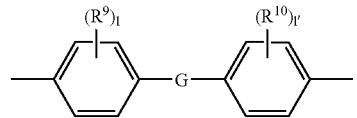

wherein G is an oxygen atom, a sulfur atom or any one of the groups selected from —S(O$_2$)—, —C(O)—, —CH$_2$—, —CH=CH—, —C(CH$_3$)$_2$— and —C(CH$_3$)(C$_6$H$_5$)—, $R^9$ and $R^{10}$ are, independently from each other, alkyl groups having 1 to 4 carbon atoms or halogen atoms, and l and l' are, independently from each other, integers of 0 to 4.

In the present invention, the most desired organic residue E is expressed by the following formula,

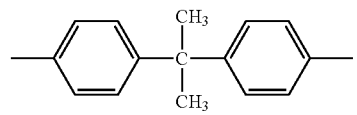

In the formula (3), i and j are positive integers or 0, and are such that an average value of i+j is 0 to 6. The compound represented by the formula (3) is usually obtained as a mixture of a plurality of compounds of which i and j are different from each other except the case where i and j are both 0. It is difficult to isolate the plurality of compounds from each other and, hence, i and j are expressed as an average value of i+j. More preferably, the average value of i+j is 2 to 6.

Concrete examples of the compound represented by the formula (3) include bisphenol A dimethacrylate, 2,2-bis(4-methacryloyloxyethoxyphenyl)propane, and 2,2-bis(3,5-dibromo-4-methacryloyloxyethoxyphenyl)propane.

In the formula (4), $R^7$ is a hydrogen atom or a methyl group, and F is an alkylene group which may have a side chain and of which the main chain has 2 to 9 carbon atoms. Examples of the alkylene group having 2 to 9 carbon atoms on the main chain include ethylene group, propylene group, trimethylene group, butylene group, neopentylene group, hexylene group and nonylene group. When the number of carbon atoms of the chain exceeds 9, the homopolymer tends to exhibit the L-scale Rockwell hardness which is not larger than 60.

Concrete examples of the compound represented by the formula (4) include ethylene glycol diacrylate, ethylene glycol dimethacrylate, 1,4-butylene glycol dimethacrylate, 1,9-nonylene glycol dimethacrylate, neopentylene glycol dimethacrylate and neopentylene glycol diacrylate.

In the formula (5), $R^8$ is a hydrogen atom, a methyl group or an ethyl group, and k is an integer of 1 to 6. When k exceeds 6, the homopolymer tends to exhibit the L-scale Rockwell hardness which is not larger than 60. Desirably, k is 3 or 4.

Concrete examples of the compound-represented by the formula (5) include diethylene glycol dimethacrylate, triethylene glycol dimethacrylate, tetraethylene glycol dimethacrylate, tripropylene glycol dimethacrylate, and tetrapropylene glycol dimethacrylate.

The radically polymerizable monomers (highly hard monomers) of which the homopolymers exhibit the L-scale Rockwell hardnesses of not smaller than 60, may be used alone or in a mixture of several kinds thereof.

Among the compounds represented by the above formulas (1) to (5), the homopolymers of some of them may exhibit the L-scale Rockwell hardnesses of smaller than 60 depending upon the combinations of substituents. In such a case, the compounds can be classified into lowly hard monomers or intermediately hard monomers as will be described later.

There are highly hard monomers other than the compounds represented by the above formulas (1) to (5), and their representative examples include bisphenol A diglycidyl methacrylate, ethylene glycol bisglycidyl methacrylate and glycidyl methacrylate.

The lowly hard monomer (of which the homopolymer exhibits the L-scale Rockwell hardness of not larger than 40) used in combination with the above highly hard monomer works to toughen the cured material (high molecular weight film) and to increase the fading rate of the photochromic compound present in the high molecular weight film.

As the lowly hard monomer, there can be exemplified difunctional monomers represented by the following formulas (6) and (7) as well as monofunctional monomers represented by the following formulas (8) and (9),

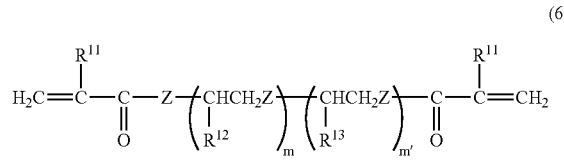
(6)

wherein $R^{11}$ is a hydrogen atom or a methyl group, $R^{12}$ and $R^{13}$ are, independently from each other, hydrogen atoms, methyl groups or ethyl groups, Z is an oxygen atom or a sulfur atom, m is an integer of 1 to 70 when $R^{11}$ is a hydrogen atom and is an integer of 7 to 70 when $R^{11}$ is a methyl group, and m' is an integer of 0 to 70,

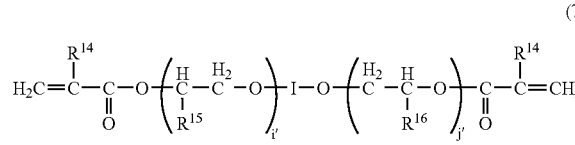
(7)

wherein $R^{14}$ is a hydrogen atom or a methyl group, $R^{15}$ and $R^{16}$ are, independently from each other, hydrogen atoms, methyl groups, ethyl groups or hydroxyl groups, I is a divalent organic residue having a ring, and i' and j' are integers, and are such that an average value of i'+j' is 8 to 40,

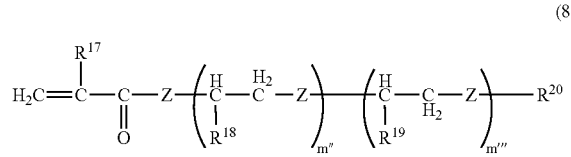
(8)

wherein $R^{17}$ is a hydrogen atom or a methyl group, $R^{18}$ and $R^{19}$ are, independently from each other, hydrogen atoms, methyl groups or ethyl groups, $R^{20}$ is a hydrogen atom, an alkyl group having 1 to 25 carbon atoms, an alkenyl group, an alkoxyalkyl group, a haloalkyl group, an aryl group having 6 to 25 carbon atoms, or an acyl group having 2 to 25 carbon atoms [excluding (meth) acryloyl group], Z is an oxygen atom or a sulfur atom, m" is an integer of 1 to 70 when $R^{17}$ is a hydrogen atom and is an integer of 4 to 70 when $R^{17}$ is a methyl group, and m''' is an integer of 0 to 70,

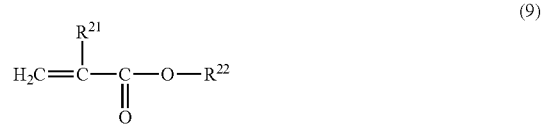
(9)

wherein $R^{21}$ is a hydrogen atom or a methyl group, and $R^{22}$ is an alkyl group having 1 to 20 carbon atoms when $R^{21}$ is a hydrogen atom and is an alkyl group having 8 to 40 carbon atoms when $R^{21}$ is a methyl group.

In the above formulas (6) to (9), $R^{11}$, $R^{14}$, $R^{17}$ and $R^{21}$ are hydrogen atoms or methyl groups. That is, the lowly hard monomer usually has not more than two (meth)acryloyloxy groups or (meth)acryloylthio groups as polymerizable groups.

In the formula (6), $R^{12}$ and $R^{13}$ are, independently from each other, hydrogen atoms, methyl groups or ethyl groups, and Z is an oxygen atom or a sulfur atom.

In the compound of the formula (6), m is an integer of 7 to 70 when $R^{11}$ is a hydrogen atom, i.e., when the compound has an acryloyloxy group or an acryloylthio group as a polymerizable group, and is an integer of 1 to 70 when $R^{13}$ is a methyl group, i.e., when the compound has a methacryloyloxy group or a methacryloylthio group as a polymerizable group. Further, m' is an integer of 0 to 70.

Concrete examples of the lowly hard monomer represented by the formula (6) include alkylene glycol di(meth)acrylates such as trialkylene glycol diacrylate, tetralkylene glycol diacrylate, nonylalkylene glycol diacrylate, and nonylalkylene glycol dimethacrylate.

In the formula (7), $R^{14}$ is a hydrogen atom, a methyl group or an ethyl group, and I is a divalent organic residue having a ring. As the organic residue I, there can be exemplified the one same as the divalent organic residue E having a ring in the above formula (3). In the formula (7), further, i' and j' are such integers that an average value of i'+j' is 8 to 40 and, preferably, 9 to 30. The integers i' and j', too, are usually expressed as an average value because of the same reasons as the integers i and j in the above formula (3).

Concrete examples of the lowly hard monomer represented by the formula (7) include 2,2-bis(4-acryloyloxypolyethylene glycol phenyl)propane having an average molecular weight of 776 and the like.

In the formula (8), $R^{17}$ is a hydrogen atom or a methyl group, and $R^{18}$ and $R^{19}$ are, independently from each other, hydrogen atoms, methyl groups or ethyl groups. $R^{20}$ is a hydrogen atom, an alkyl group having 1 to 25 carbon atoms, an alkenyl group, an alkoxyalkyl group or haloalkyl group, an aryl group having 6 to 25 carbon atoms, or an acyl group having 2 to 25 carbon atoms other than the acryloyl group.

As the alkyl group or alkenyl group having 1 to 25 carbon atoms, there can be exemplified a methyl group, an ethyl group, a propyl group and a nonyl group. The alkyl group or the alkenyl group may be of a straight chain or a branched chain, and may further have a substituent such as halogen atom, hydroxyl group, aryl group or epoxy group.

As the alkoxyalkyl group having 1 to 25 carbon atoms, there can be exemplified a methoxybutyl group, an ethoxybuty group, a butoxybutyl group and a methoxynonyl group.

As the aryl group having 6 to 25 carbon atoms, there can be exemplified a phenyl group, a toluyl group, an anthranyl group and an octylphenyl group. As the acyl group other than the (meth)acryloyl group, there can be exemplified an acetyl group, a propionyl group, a butylyl group, a valeryl group, and an oleyl group.

In the compound of the formula (8), m" is an integer of 1 to 70 when $R^{17}$ is a hydrogen atom, i.e., when the compound has an acryloyloxy group or an acryloylthio group as a polymerizable group, and is an integer of 4 to 70 when $R^{17}$ is a methyl group, i.e., when the compound has a methacryloyloxy group or a methacryloylthio group as a polymerizable group. Further, m''' is an integer of 0 to 70.

Concrete examples of the lowly hard monomer represented by the formula (8) include polyalkylene glycol (meth)acrylates such as polyethylene glycol methacrylate having an average molecular weight of 526, polyethylene glycol methacrylate having an average molecular weight of 360, methyletherpolyethylene glycol methacrylate having an average molecular weight of 475, methyletherpolyethylene glycol methacrylate having an average molecular weight of 1000, polypropylene glycol methacrylate having an average molecular weight of 375, polypropylene methacrylate having an average molecular weight of 430, polypropylene methacrylate having an average molecular weight of 622, methyletherpolypropylene glycol methacrylate having an average molecular weight of 620, polytetramethylene glycol methacrylate having an average molecular weight of 566, octylphenyletherpolyethylene glycol methacrylate having an average molecular weight of 2,034, nonyletherpolyethylene glycol methacrylate having an average molecular weight of 610, methyletherpolyethylenethio glycol methacrylate having an average molecular weight of 640, and perfluoroheptylethylene glycol methacrylate having an average molecular weight of 498.

In the formula (9), $R^{21}$ is a hydrogen atom or a methyl group, and $R^{22}$ is an alkyl group having 1 to 20 carbon atoms when $R^{21}$ is a hydrogen atom and is an alkyl group having 8 to 40 carbon atoms when $R^{21}$ is a methyl group.

The alkyl group may be a straight chain or a branched chain, and may have a substituent such as halogen atom, hydroxyl group, alkoxyl group, acyl group or epoxy group.

Concrete examples of the lowly hard monomer represented by the formula (9) include stearyl methacrylate, lauryl methacrylate, ethylhexyl methacrylate, methyl acrylate, ethyl acrylate, butyl acrylate and lauryl acrylate.

In the present invention, the lowly hard monomers of which the homopolymer exhibits the L-scale Rockwell hardness of not larger than 40 may be used in one kind in combination with the highly hard monomer mentioned above, or may be used in two or more kinds in combination together with the highly hard monomer. Among the lowly hard monomers represented by the above formulas (6) to (9), it is particularly desired to use methyletherpolyethylene glycol methacrylate having an average molecular weight of 475, methyletherpolyethylene glycol methacrylate having an average molecular weight of 1,000, trialkylene glycol diacrylate, tetraalkylene glycol diacrylate, nonylalkylene glycol diacrylate, methyl acrylate, ethyl acrylate, butyl acrylate and lauryl acrylate.

Among the compounds represented by the above formulas (6) to (9), homopolymers of some of which exhibits the L-scale Rockwell hardness of not smaller than 40 depending upon the combination of substituents. However, such compounds are classified to be the highly hard monomers mentioned above or to be intermediately hard monomers that will be described later.

In the photopolymerizable and curable composition used in the present invention, it is allowable to use, as a radically polymerizable monomer, a monomer other than the above-mentioned highly hard monomer or the lowly hard monomer, i.e., to use an intermediately hard monomer of which the homopolymer exhibits the L-scale Rockwell hardness of not smaller than 40 but smaller than 60, in combination with the highly hard monomer and the lowly hard monomer. Examples of the intermediately hard monomer include radically polymerizable monofunctional monomers, i.e., bifunctional (meth)acrylates such as polytetramethylene glycol dimethacrylate having an average molecular weight of 650, polytetramethylene glycol dimethacrylate having an average molecular weight of 1,400, and bis(2-methacryloyloxyethylthioethyl)sulfide; multivalent allyl compounds such as diallyl phthalate, diallyl isophthalate, diallyl tartarate, diallyl epoxysuccinate, diallyl fumarate, diallyl chloroendoate, diallyl hexaphthalate and allyl diglycol carbonate; multivalent thioacrylic acids and multivalent thiomethacrylic acid ester compounds, such as 1,2-bis(methacryloylthio)ethane, bis(2-acryloylthioethyl)ether, and 1,4-bis(methacryloylthiomethyl)benzene; unsaturated carboxylic acids such as acrylic acid, methacrylic acid and maleic anhydride; acrylic acids and methacrylic acid ester compounds, such as methyl methacrylate, butyl methacrylate, benzyl methacrylate, phenyl methacrylate, 2-hydroxyethyl methacrylate, and biphenyl methacrylate; fumaric acid ester compounds such as diethyl fumarate and diphenyl fumarate; thioacrylic acids and thiomethacrylic acid ester compounds such as methylthio acrylate, benzylthio acrylate and benzyl thiomethacrylate; vinyl compounds such as styrene, chlorostyrene, methylstyrene, vinyl naphthalene, α-methylstyrene dimer, bromostyrene, divinylbenzene and vinylpyrrolidone; and (meth)acrylates having an unsaturated bond in the molecules and of which the hydrocarbon chain has 6 to 25 carbon atoms, such as oleyl methacrylate, nerol methacrylate, geraniol methacrylate, linalool methacrtylate and farnesol methacrylate.

In the present invention, it is desired that the radically polymerizable monomer (A) contains 5 to 70% by weight of the lowly hard monomers and 5 to 95% by weight of the highly hard monomers in order to maintain good balance among the resistance of the cured material (photochromic high-molecular film) against the solvent, hardness, heat resistance and photochromic properties such as color density and fading rate. Further, it is particularly desired that the radically polymerizable monomer is blended with at least not smaller than 5% by weight of a homomer having not less than three radically polymerizable groups as the highly hard monomer.

It is further desired that the radically polymerizable monomer (A) that is used is further blended with a radically polymerizable monomer (hereinafter often referred to simply as epoxy monomer) having at least one epoxy group and at least one radically polymerizable group in the molecules in addition to the monomers that are classified depending upon the hardness as described above. Use of the epoxy monomer improves the light resistance of the photochromic compound and, further, improves the adhesion between the substrate and the photochromic high molecular weight film (coated layer). The homopolymer of the epoxy monomer may exhibit the L-scale Rockwell hardness of not smaller than 60 or not larger than 40 depending upon the structure thereof. If classified depending upon the hardness of the homopolymer, it can be grouped into any one of the highly hard monomer, lowly hard monomer or intermediately hard monomer depending upon the hardness.

As the epoxy monomer, there can be used a known compound. It is, however, desired to use a compound having a (meth)acryloyloxy group as the radically polymerizable group. Concretely, there can be used a compound represented by the following formula (10),

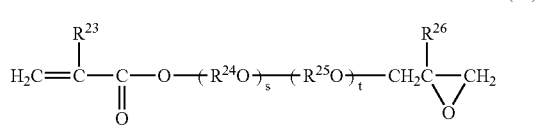

(10)

wherein $R^{23}$ and $R^{26}$ are, independently from each other, hydrogen atoms or methyl groups, $R^{24}$ and $R^{25}$ are, independently from each other, alkylene groups having 1 to 4 carbon atoms or groups represented by the following formula,

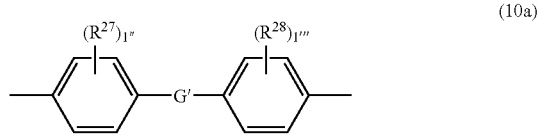

(10a)

wherein G' is an oxygen atom, a sulfur atom or any one of the groups selected from —S(O$_2$)—, —C(O)—, —CH$_2$—, —CH=CH—, —C(CH$_3$)$_2$— and —C(CH$_3$)(C$_6$H$_5$)—, $R^{27}$ and $R^{28}$ are, independently from each other, alkyl groups having 1 to 4 carbon atoms or halogen atoms, and 1″ and 1‴ are, independently from each other, integers of 0 to 4, and s and t are, independently from each other, integers of 0 to 20.

Examples of the alkylene group having 1 to 4 carbon atoms represented by $R^{24}$ and $R^{25}$ in the formula (10) include methylene group, ethylene group, propylene group, trimethylene group and butylene group. Further, the alkylene group may have a hydroxyl group or a halogen atom as a substituent.

When $R^{24}$ or $R^{25}$ is a group represented by the above formula (10a), G' is an oxygen atom, a sulfur atom or any one of —S(O$_2$)—, —C(O)—, —CH$_2$—, —CH=CH—, —C(CH$_3$)$_2$— or —C(CH$_3$)(C$_6$H$_5$)—. In FIG. (10a), $R^{27}$ and $R^{28}$ are, independently from each other, alkyl groups having 1 to 4 carbon atoms, such as methyl groups, ethyl groups, propyl groups or butyl groups, or are halogen atoms such as chlorine atoms or bromine atoms, and 1 and 1‴ are, independently from each other, integers of 0 to 4. Most desirably, the group represented by the formula (10a) is the one represented by the following formula,

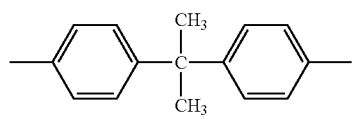

Concrete examples of the epoxy monomer represented by the above formula (10) include glycidyl acrylate, glycidyl methacrylate, β-methylglycidyl methacrylate, bisphenol A-monoglycidylether methacrylate, 4-glycidyloxy methacrylate, 3-(glycidyl-2-oxyethoxy)-2-hydroxypropyl methacrylate, 3-(glycidyloxy-1-isopropyloxy)-2-hydroxypropyl acrylate, 3-glycidyloxy-2-hydroxypropyloxy)-2-hydroxypropyl acrylate and glycidyloxypolyethylene glycol methacrylate having an average molecular weight of 540. Among them, glycidyl acrylate, glycidyl methacrylate and glycidyloxypolyethylene glycol methacrylate having an average molecular weight of 540 are particularly desired.

It is desired that the radically polymerizable monomer (A) is blended with the epoxy monomer at a ratio of 0.01 to 30% by weight and, particularly, 0.1 to 20% by weight.

In order to improve the hardness of the photochromic high molecular weight film or to improve the adhesion to the substrate such as spectacle lens, a radically polymerizable monomer (hereinafter often called silyl monomer) having a silanol group or a group that forms the silanol group upon the hydrolysis is used or a radically polymerizable monomer (hereinafter often called isocyanate monomer) having an isocyanate group is used together with the above-mentioned highly hard monomer and the lowly hard monomer.

As the silyl monomer, a known compound can be used without limitation provided it has a silanol group (≡Si—OH) or a group that forms the silanol group upon the hydrolysis and a radically polymerizable group.

In the silyl monomer, concrete examples of the group that forms the silanol group upon the hydrolysis include alkoxysilyl group (≡Si—O—R; R is an alkyl group), aryloxysilyl group (≡Si—O—Ar; Ar is an aryl group which may be substituted), halogenated silyl group (≡Si—X; X is a halogen atom), and silyloxysilyl group (disiloxane bond; ≡Si—O—Si≡). It is desired to use the alkoxysilyl group or the silyloxysilyl group from the standpoint of easily forming the silanol group, easy synthesis and preservation, and little effect upon the properties of the cured body caused by the group dissociated from the silicon atom due to the reaction. It is more desired to use the alkoxysilyl group including an alkoxyl group having 1 to 4 carbon atoms, and it is most desired to use the methoxysilyl group or the ethoxysilyl group.

As the radically polymerizable group possessed by the silyl monomer, there can be exemplified (meth)acryloyl group; groups derived from (meth)acryloyl group such as (meth)acryloyloxy group, (meth)acryloylamino group and (meth)acryloylthio group; and known radically polymerizable groups such as vinyl group, allyl group and styryl group. When the radically polymerizable group is a vinyl group, allyl group or styryl group, then, the radically polymerizable group may have a substituent. As the substituent, there can be exemplified an alkyl group having 1 to 4 carbon atoms, such as methyl group, ethyl group, propyl group, butyl group, chloromethyl group, trifluoromethyl group, or halogenated alkyl groups, halogen atom, cyano group, nitro group and hydroxyl group. When the radically polymerizable group is a (meth)acryloylamino group, the amidonitrogen atom of the group may be bonded with (meth)acryloyl group; silanol group, group that forms the silanol group upon the hydrolysis; organic group such as substituted or unsubstituted alkyl group, aryl group or allyl group.

Among these radically polymerizable groups, the acryloyl group or the (meth)acryloyloxy group is desired from the standpoint of easy availability and polymerization, and the (meth)acryloyloxy group is more desired.

In the present invention, the preferred silyl monomers are those represented by the following formulas (11) to (13),

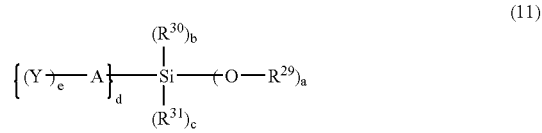

(11)

wherein $R^{29}$ is an alkyl group or an aryl group, $R^{30}$ and $R^{31}$ are, independently from each other, alkyl groups, aryl groups or acyl groups, A is an organic residue having a valency of 2 to 4, Y is a radically polymerizable group, a is an integer of 1 to 3, b is an integer of 0 to 2, c is an integer of 0 to 2, d is an integer of 1 to 3 and e is an integer of 1 to 3, but a+b+c+d=4,

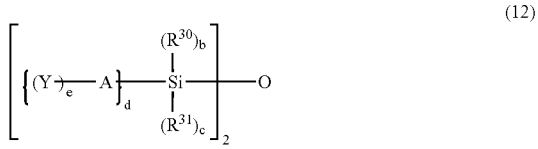
(12)

wherein $R^{30}$ and $R^{31}$ are, independently from each other, alkyl groups, aryl groups or acyl groups, A is an organic residue having a valency of 2 to 4, Y is a radically polymerizable group, b is an integer of 0 to 2, c is an integer of 0 to 2, d is an integer of 1 to 3 and e is an integer of 1 to 3, but b +c +d 3,

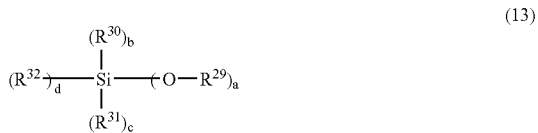
(13)

wherein $R^{29}$ is an alkyl group or an aryl group, $R^{30}$ and $R^{31}$ are, independently from each other, alkyl groups, aryl groups or acyl groups, $R^{32}$ is a vinyl group, a is an integer of 1 to 3, b is an integer of 0 to 2, c is an integer of 0 to 2 and d is an integer of 1 to 3, but a+b+c+d=4.

In the formulas (11) and (13), $R^{29}$ is an alkyl group or an aryl group and is, preferably, an unsubstituted or substituted alkyl group of which the main chain has 1 to 10 carbon atoms, or an unsubstituted or substituted aryl group of which the ring has 6 to 10 carbon atoms from the standpoint of easily generating a silanol group upon the hydrolysis and preservation stability. Examples of the substituent for the alkyl group or the aryl group include alkyl groups having 1 to 10 carbon atoms, such as methyl group, ethyl group and propyl group; halogenated alkyl groups having 1 to 10 carbon atoms, such as chloromethyl group and trifluoromethyl group; alkoxyl groups having 1 to 10 carbon atoms, such as methoxy group, ethoxy group and butoxy group; acyl groups having 2 to 10 carbon atoms, such as acetyl group, propionyl group, oleyl group and benzoyl group; amino group; alkyl-substituted amino groups having 1 to 10 carbon atoms, such as methylamino group, ethylamino group, dimethylamino group and diethylamino group; halogen atoms such as fluorine atom, chlorine atom and bromine atom; hydroxyl group; carboxyl group; mercapto group; cyano group; and nitro group. In the present invention, preferred examples of the group $R^{29}$ include methyl group, ethyl group, propyl group, butyl group, chloromethyl group, phenyl group, toluyl group and xylyl group. Most desired examples include alkyl group having 1 to 4 carbon atoms and, particularly, methyl group or ethyl group from the standpoint of easily generating the silanol group upon the hydrolysis and preservation stability.

In the formulas (11) to (13), $R^{30}$ and $R^{31}$ are, independently from each other, alkyl groups, aryl groups or acyl groups. As the alkyl group and the aryl group, there can be exemplified the same groups as those described concerning $R^{29}$, and preferred alkyl groups and aryl groups are the same as those described concerning $R^{29}$. The acyl group may be the aliphatic one or the aromatic one, and particularly preferred examples thereof are those having 2 to 10 carbon atoms, such as acetyl group, propionyl group and benzoyl group.

In the formulas (11) and (12), further, A is an organic residue having a valency of 2 to 4. There is no particular limitation on the structure of the organic residue A, and a side chain and a substituent may be possessed. Further, the structure thereof may have a bond such as ether bond, ester bond, amide bond, amino bond, urethane bond, thioether bond or sulfonyl bond other than carbon-carbon bond. An oxo group (ketone carbon) may further be included therein. Examples of the substituent that may be possessed by the organic resin A include halogen atoms such as fluorine atom, chlorine atom and bromine atom, as well as hydroxyl group, amino group, mercapto group, cyano group and nitro group.

In the formulas (11) and (12), the organic residue A preferably has 1 to 30 and, particularly, 1 to 10 carbon atoms. Concrete examples of the preferred organic resin A include alkylene groups having 1 to 10 carbon atoms, such as methylene group, ethylene group, propylene group, trimethylene group and butylene group, alkylenedioxy groups having 1 to 10 carbon atoms, such as methylenedioxy group, ethylenedioxy group, propylenedioxy group and butylenedioxy group, and those represented by the following formulas,

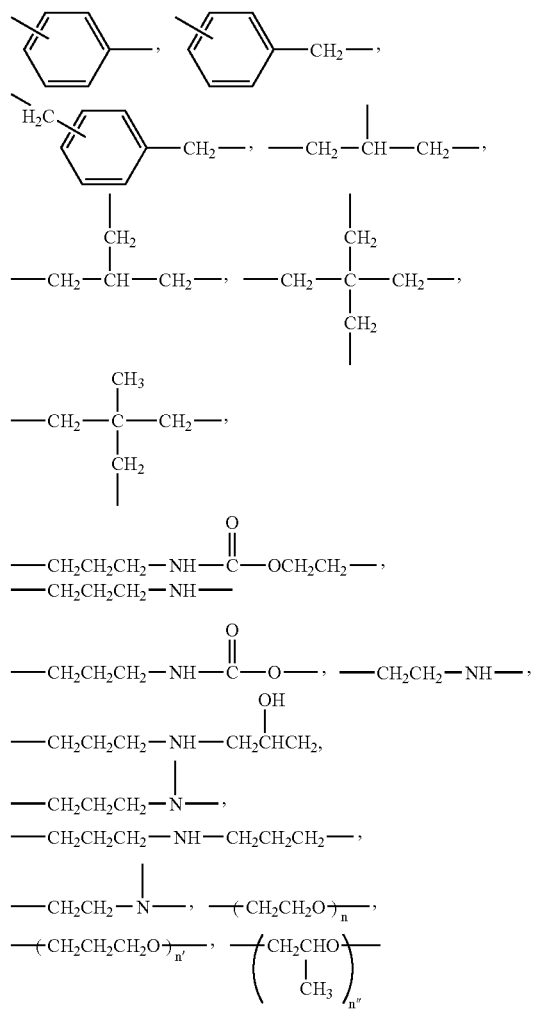

wherein n is an integer of 1 to 5, and n' and n" are integers of 1 to 3.

The preferred organic residues A exemplified above may have the substituent described above.

In the formulas (11) and (12), Y is a radically polymerizable group and its examples include (meth)acryloyl groups and groups derived from (meth)acryloyl group, such as (meth)acryloyloxy group, (meth)acryloylamino group and (meth)acryloylthio group, as well as substituted or unsubstituted vinyl group, substituted or unsubstituted allyl group, and substituted or unsubstituted styryl group. Preferred examples include (meth)acryloyl group and (meth)acryloyloxy group.

Concrete examples of the silyl monomer represented by the above formulas (11) to (13) include γ-methacryloyloxypropyltrimethoxysilane, γ-methacryloyloxypropyltriethoxysilane, γ-methacryloyloxypropylmethyldimethoxysilane, (3-acryloxypropyl)dimethylmethoxysilane, (3-acryloxypropyl)methyldimethoxysilane, (3-acryloxypropyl)trimethoxysilane, 3-(N-allylamino)propyltrimethoxysilane, allyldimethoxysilane, allyltriethoxysilane, allyltrimethoxysilane, 3-aminophenbxydimethylvinylsilane, 4-aminophenoxydimethylvinylsilane, 3-(3-aminopropoxy)-3,3-dimethyl-1-propenyltrimethoxysilane, butenyltriethoxysilane, 2-(chloromethyl)allyltrimethoxysilane, diethoxyvinylsilane, 1,3-divinyltetraethoxydisiloxane, dococenyltriethoxysilane, o-(methacryloxyethyl)-N-(triethoxysilylpropyl)urethane, N-(3-methacryloxy-2-hydroxypropyl)-3-aminopropyltriethoxysilane, methacryloxyethoxytrimethylsilane, (methacryloxymethyl)dimethylethoxysilane, methacryloxymethyltriethoxysilane, methacryloxymethyltrimethoxysilane, methacryloxypropyldimethylethoxysilane, methacryloxypropyldimethylmethoxysilane, methacryloxypropyl tris (methoxyethoxy)silane, 7-octenyltrimethoxysilane, 1,3-bis (methacryloxy)-2-trimethyloxypropane, tetrakis(2-methacryloxyethoxy)silane, trivinylethoxysilane, trivinylmethoxysilane, vinyldimethylethoxysilane, vinyldiphenylethoxysilane, vinylmethyldiacetoxysilane, vinylmethyldiethoxysilane, vinylmethyldimethoxysilane, o-(vinylbxyethyl)-N-(triethoxysilylpropyl)urethane, vinyloxytrimethylsilane, vinylphenyldiethoxysilane, vinylphenylmethylmethoxysilane, vinyltriacetoxysilane, vinyltri-t-butoxysilane, vinyltriethoxysilane, vinyltriisopropenoxysilane, vinyltriisopropoxysilane, vinyltrimethoxysilane, and vinyltris(2-methoxyethoxy) silane. These silyl monomers may be used in a single kind or in a combination of two or more kinds.

Among the above-mentioned silyl monomers according to the present invention, it is desired to use the silyl monomers represented by the formula (11). Among them, a silyl monomer represented by the following formula (14) is particularly preferably used,

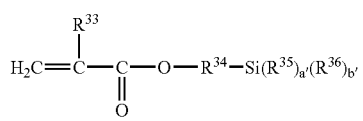

(14)

wherein $R^{33}$ is a hydrogen atom or a methyl group, $R^{34}$ is an alkylene group having 1 to 10 carbon atoms, $R^{35}$ is an alkoxyl group having 1 to 4 carbon atoms, $R^{36}$ is an alkyl group having 1 to 4 carbon atoms, a' is an integer of 1 to 3, and b' is an integer of 0 to 2, but a'+b'=3.

As the alkylene group $R^{33}$ having 1 to 10 carbon atoms in the above formula (14), there can be exemplified ethylene group, propylene group, trimethylene group and butylene group. As the alkoxyl group $R^{35}$ having 1 to 4 carbon atoms, there can be exemplified methoxy group, ethoxy group, propoxy group and butoxy group. As the alkyl group $R^{36}$ having 1 to 4 carbon atoms, there can be exemplified methyl group, ethyl group, propyl group and butyl group.

Concrete examples of the silyl monomer represented by the formula (14) include γ-methacryloyloxypropyltrimethoxysilane, γ-methacryloyloxypropyltriethoxysilane, γ-methacryloyloxypropylmethyldimethoxysilane, (3-acryloxypropyl)dimethylmethoxysilane, (3-acryloxypropyl)methyldimethoxysilane, (3-acryloxypropyl)trimethoxysilane, (methacryloxymethyl)dimethylethoxysilane, methacryloxymethyltriethoxysilane, methacryloxymethyltrimethoxysilane, methacryloxypropyldimethylethoxysilane and methacryloxypropyldimethylmethoxysilane.

In the present invention, an isocyanate monomer is used instead of the above silyl monomer or together with the above silyl monomer to improve the adhesion to the substrate and to the hard coating material.

As the isocyanate monomer, there can be used any compound without limitation provided it has an isocyanate group (—NCO) and a radically polymerizable group. For example, there can be used the compounds represented by the following formulas (15) and (16),

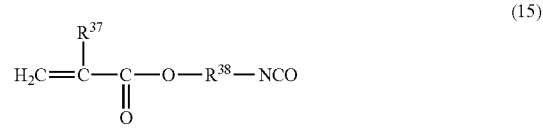

(15)

wherein $R^{37}$ is a hydrogen atom or a methyl group and $R^{38}$ is an alkylene group,

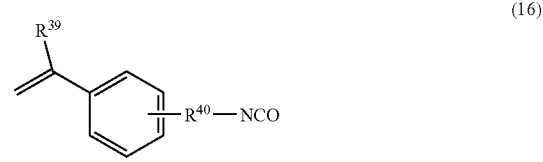

(16)

wherein $R^{39}$ is a hydrogen atom or a methyl group and $R^{40}$ is an alkylene group.

In the above formulas (15) and (16), $R^{38}$ and $R^{40}$ are both alkylene groups and, particularly preferably, alkylene groups having 1 to 10 carbon atoms, such as methylene groups, ethylene groups, propylene groups, trimethylene groups or butylene groups.

In the present invention, concrete examples of the isocyanate monomer that can be preferably used include 2-isocyanatoethoxymethacrylate, 4-(2-isocyanatoisopropyl)styrene, and the like. The above isocyanate monomers can be used in one kind or in a combination of two or more kinds. There is no particular limitation on the amount of blending the silyl monomer or the isocyanate monomer. In order to improve the adhesion to the substrate such as spectacle lens and to the hard coating layer formed on the high molecular weight film, however, it is desired that the silyl monomer or the isocyanate monomer is blended in a total amount thereof of 0.5 to 20% by weight and, particularly, 1 to 10% by weight of the whole radically polymerizable monomers. When the amount of use is too small, it becomes difficult to enhance the adhesion of the high molecular weight film to the substrate and to the hard coated layer. When the amount of use is too large, on the other hand, the abrasion resistance decreases when the hard coated layer is formed on the high molecular weight film and, besides, photochromic properties such as color density and fading rate of the high molecular weight film decrease.

In the present invention, when the above-mentioned silyl monomer or the isocyanate monomer is used as the radically polymerizable monomer, it is desired that the photopolymerizable and curable composition is blended with an amine compound as a catalyst. Upon being blended with the amine compound, it is allowed to greatly improve the adhesion between the high molecular film which is a cured material of the composition and the substrate as well as to greatly improve the adhesion between the high molecular weight film and the hard coated layer.

As the amine compound, there can be used any known amine compound without limitation provided it is a basic compound that works as a condensation or addition catalyst for the above-mentioned silyl monomer or the isocyanate monomer. Here, a hindered amine compound having, as an amino group, only a group represented by the following formula,

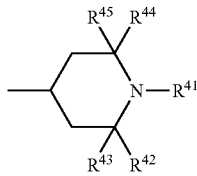

wherein $R^{41}$ is a hydrogen atom or an alkyl group, $R^{42}$, $R^{43}$, $R^{44}$ and $R^{45}$ are the same or different alkyl groups, does not have the above catalytic action, and is excluded from the amine compound that is referred to above.

Concrete examples of the amine compound that can be preferably used in the present invention include non-polymerizable low molecular amine compounds, such as triethanolamine, N-methyldiethanolamine, triisopropanolamine, 4,4-dimethylaminobenzophenone and diazabicyclooctane; amine compounds having a polymerizable group, such as N,N-dimethylaminoethyl methacrylate, and N,N-diethylaminoethyl methacrylate; and amine compounds having a silyl group, such as n-(hydroxyethyl)-N-methylaminopropyltrimethoxysilane, dimethoxyphenyl-2-piperidinoethoxysilane, N,N-diethylaminomethyltrimethylsilane, and (N,N-diethyl-3-aminopropyl)trimethoxysilane. These amine compounds can be used in a single kind or in a combination of two or more kinds.

Among the above amine compounds, what are particularly preferably used are those amine compounds having a hydroxyl group, a (meth)acryloyloxy group as a radically polymerizable group or a group capable of forming a silanol group upon the hydrolysis from the standpoint of improving the adhesion. Such amine compounds are represented by, for example, the following formula (17),

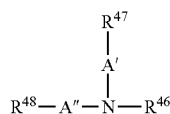

(17)

wherein $R^{46}$ is a hydrogen atom or a straight-chain alkyl group having 1 to 4 carbon atoms, $R^{47}$ is a hydroxyl group, a (meth)acryloyloxy group or a group capable of forming a silanol group upon the hydrolysis, $R^{48}$ is a hydrogen atom, an alkyl group having 1 to 6 carbon atoms, a hydroxyl group, a (meth)acryloyloxy group or a group capable of forming a silanol group upon the hydrolysis, A' is an alkylene group having 2 to 6 carbon atoms, A" is an alkylene group having 1 to 6 carbon atoms when $R^{48}$ is a hydrogen atom or an alkyl group, and is an alkylene group having 2 to 6 carbon atoms when $R^{48}$ is a hydroxyl group, a (meth)acryloyloxy group or a group capable of forming a silanol group upon the hydrolysis.

The above amine compound is blended in an amount in a range of 0.01 to 20 parts by weight, preferably, 0.1 to 10 parts by weight, and more preferably, 1 to 10 parts by weight per 100 parts by weight of the whole radically polymerizable monomers (A). When the amount is smaller than 0.01 part by weight or exceeds 20 parts by weight, the adhesion between the photochromic high molecular weight film and the substrate is not improved. When the amount exceeds 20 parts by weight, further, the photochromic high molecular weight film tends to exhibit yellowish color, which is not desirable.

(B) Photochromic Compounds.

According to the present invention, it is necessary to blend the photopolymerizable and curable composition with a photochromic compound in an amount of 0.2 to 20% by weight in order to impart photochromic property to the high molecular weight film formed on the curved surface of the substrate. That is, the high molecular weight film formed by curing the photopolymerizable and curable composition has a thickness of, for example, 1 to 100 μm so will not to impair the properties (particularly, mechanical properties such as Rockwell hardness and optical properties) of the substrate such as spectacle lenses. The high molecular weight film having a large thickness impairs the properties of the substrate. According to the present invention, the concentration of photochromic compound in the high molecular weight film is as large as 0.2 to 20% by weight.

Therefore, the photochromic properties can be imparted to the substrate despite the film being thin. When the concentration of the photochromic compound is not smaller than 20% by weight, the photochromic compound is aggregated or bleeds out to deteriorate the photochromic properties of the obtained laminate (high molecular weight film). When the concentration is smaller than 0.2% by weight, on the other hand, the photochromic properties are not obtained to a sufficient degree even when the film is as thick as 100 μm.

The concentration of the photochromic compound can be suitably determined to lie within the above range (0.2 to 20% by weight) depending upon the thickness of the high molecular weight film formed on the curved surface of the substrate. This will be described later.

In the present invention, there can be used any known photochromic compound such as fulgimide compound, spirooxazine compound, or chromene compound. The above fulgimide compound, spirooxazine compound and chromene compound have been disclosed in, for example, Japanese Unexamined Patent Publications (Kokai) Nos. 2-28154, 62-288830, WO94/22850 and WO96/14596. As compounds having excellent photochromic properties, there can be further used even those compounds that are disclosed in Japanese Unexamined Patent Publications (Kokai) Nos. 2001-114775, 2001-031670, 2001-011067, 2001-011066, 2000-347346, 2000-344762, 2000-344761, 2000-327676, 2000-327675, 2000-356347, 2000-229976, 2000-229975, 2000-229974, 2000-229973, 2000-229972, 2000-219687, 2000-

219686, 2000-219685, 11-322739, 11-286484, 11-279171, 10-298176, 09-218301, 09-124645, 08-295690, 08-176139 and 08-157467.

In the present invention, further, among the above-mentioned photochromic compounds, it is particularly desired to use a chromene compound from the standpoint of light resistance, color density and fading rate. A chromene compound represented by the following formula (18) exhibits particularly favorable photochromic properties,

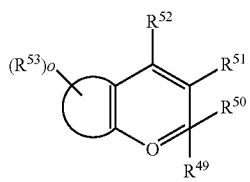
(18)

wherein a group represented by the following formula (19),

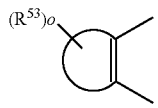
(19)

is a substituted or unsubstituted aromatic hydrocarbon group, or a substituted or unsubstituted unsaturated heterocyclic group, $R^{51}$, $R^{52}$ and $R^{53}$ are, independently from each other, hydrogen atoms, alkyl groups, alkoxyl groups, aralkoxy groups, amino groups, substituted amino groups, cyano groups, substituted or unsubstituted aryl groups, halogen atoms, aralkyl groups, hydroxyl groups, substituted or unsubstituted alkynyl groups, substituted or unsubstituted heterocyclic groups having a nitrogen atom as a hetero atom (the nitrogen atom is bonded to a pyran ring or to a ring of the group represented by the above formula (19)), or condensed heterocyclic groups in which the heterocyclic group is condensed with an aromatic hydrocarbon ring or an aromatic heterocyclic ring, o is an integer of 0 to 6, $R^{49}$ and $R^{50}$ are, independently from each other, substituted or unsubstituted aryl groups, substituted or unsubstituted heteroaryl groups, alkyl groups, or groups represented by the following formula (20) or (21),

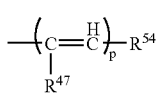
(20)

wherein $R^{54}$ is a substituted or unsubstituted aryl group, or substituted or unsubstituted heteroaryl group, $R^{55}$ is a hydrogen atom, an alkyl group or a halogen atom, and p is an integer of 1 to 3,

(21)

wherein $R^{56}$ is a substituted or unsubstituted aryl group, or a substituted or unsubstituted heteroaryl group, and p' is an integer of 1 to 3,
and $R^{49}$ and $R^{50}$ together may constitute an aliphatic hydrocarbon ring or an aromatic hydrocarbon ring.

The substituents of the substituted aryl groups or substituted heteroaryl groups $R^{49}$ and $R^{50}$ in the above formulas (20) and (21) may be those groups exemplified for the groups $R^{51}$ and $R^{52}$.

Among the chromene compounds represented by the above formula (18) according to the present invention, it is particularly desired to use the compounds represented by the following formulas (22) to (27) from the standpoint of light resistance, color density and fading rate,

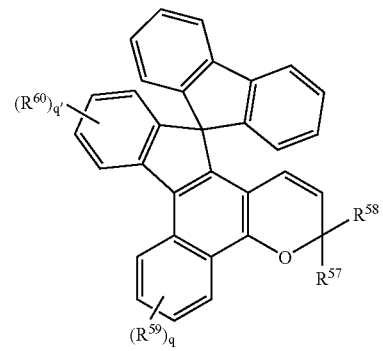
(22)

wherein $R^{57}$ and $R^{58}$ are the same as those exemplified for $R^{49}$ and $R^{50}$ in the above formula (18), $R^{59}$ and $R^{60}$ are the same as those exemplified for $R^{53}$ in the above formula (18), and q and q' are, respectively, inters of 1 to 2,

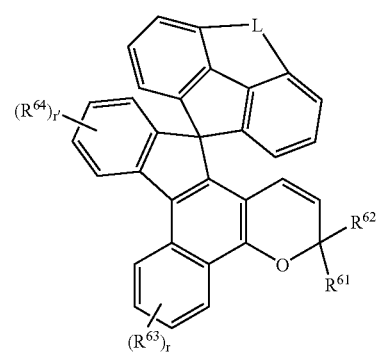
(23)

wherein $R^{61}$ and $R^{62}$ are the same as those exemplified for $R^{49}$ and $R^{50}$ in the above formula (18), $R^{63}$ and $R^{64}$ are the same as those exemplified for $R^{53}$ in the above formula (18), and L is a group represented by any one of the following formulas,

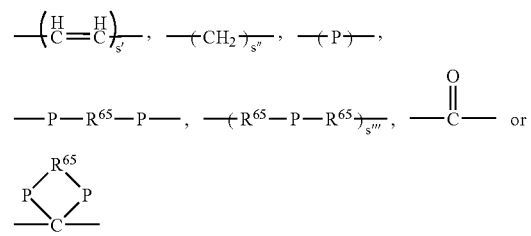

wherein P is an oxygen atom or a sulfur atom, $R^{57}$ is an alkylene group having 1 to 6 carbon atoms, s', s" and s'" are integers of 1 to 4, and r and r' are, independently from each other, 1 or 2, (24)

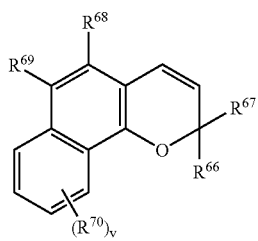

wherein $R^{66}$ and $R^{67}$ are the same as those exemplified for R and $R^{50}$ in the above formula (18), $R^{68}$, $R^{69}$ and $R^{70}$ are the same as those exemplified for $R^{53}$ in the above formula (18), and v is 1 or 2, (25)

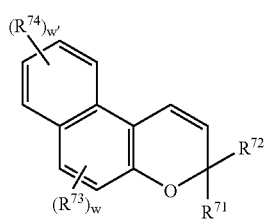

wherein $R^{71}$ and $R^{72}$ are the same as those exemplified for $R^{49}$ and $R^{50}$ in the above formula (18), $R^{73}$ and $R^{74}$ are the same as those exemplified for $R^{53}$ in the above formula (18), and w and w' are, independently from each other, 1 or 2, (26)

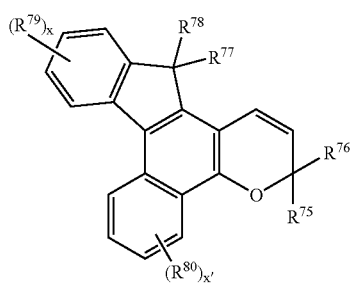

wherein $R^{75}$ and $R^{76}$ are the same as those exemplified for $R^{49}$ and $R^{50}$ in the above formula (18), $R^{77}$, $R^{78}$, $R^{79}$ and $R^{80}$ are the same as those exemplified for $R^{53}$ in the above formula (18), and x and x' are, independently from each other, 1 or 2, (27)

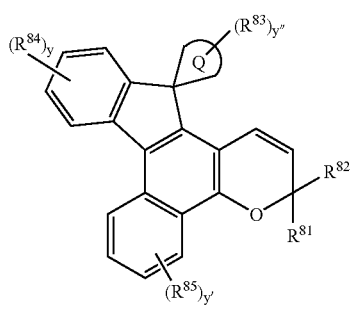

wherein $R^{81}$ and $R^{82}$ are the same as those exemplified for $R^{49}$ and $R^{50}$ in the above formula (18), $R^{83}$, $R^{84}$ and $R^{85}$ are the same as those exemplified for $R^{53}$ in the above formula (18), the ring Q is an aliphatic hydrocarbon ring, y, y' and y" are, independently from each other, 1 or 2.

Among the chromene compounds represented by the above formulas (22) to (27) in the present invention, it is most desired to use the chromene compounds of the following structures,

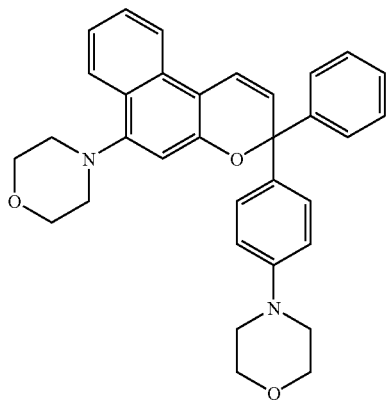

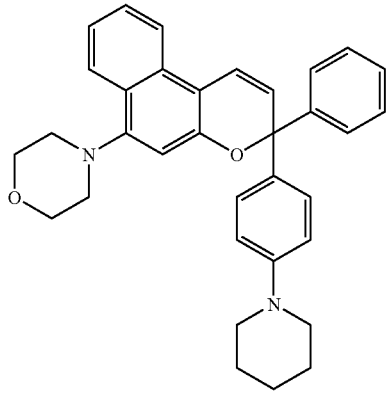

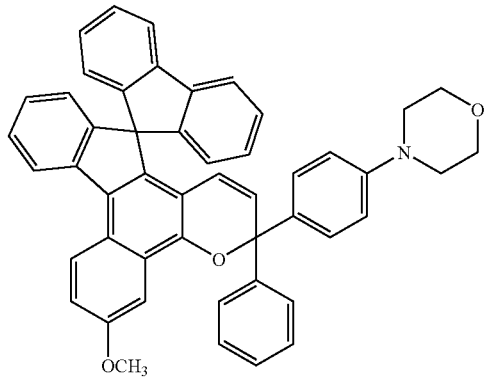

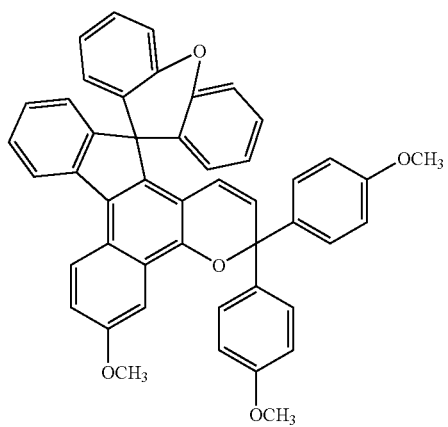

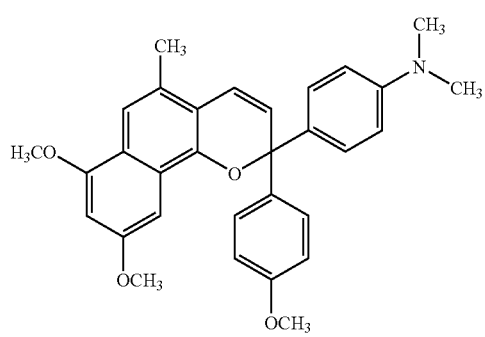
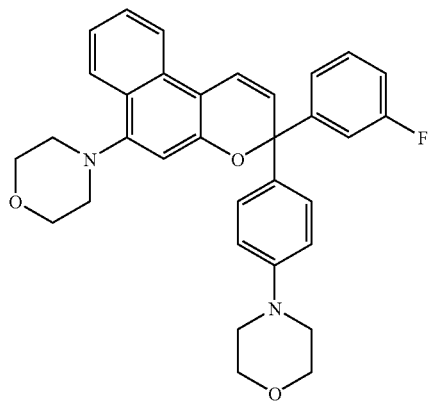
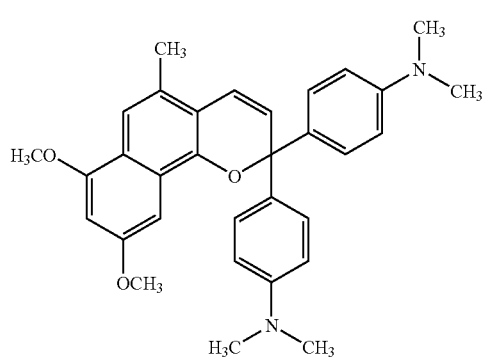
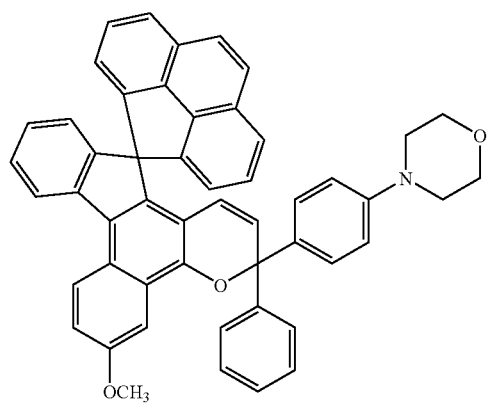
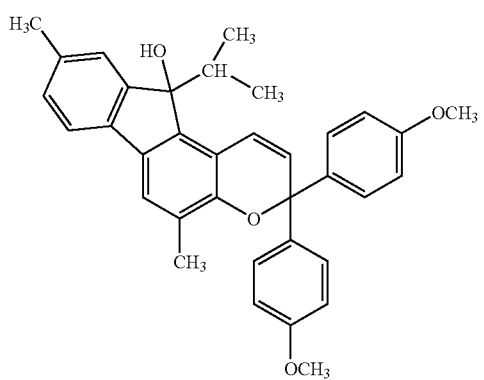
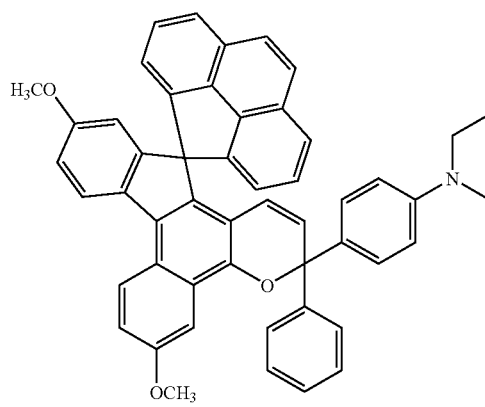
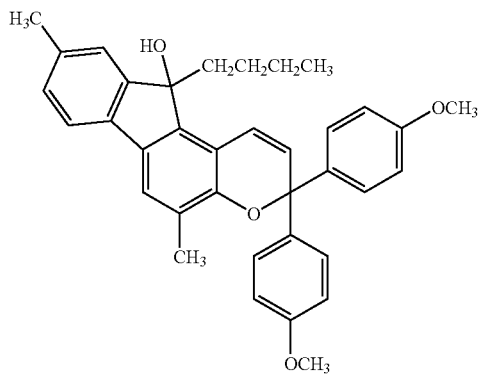

-continued

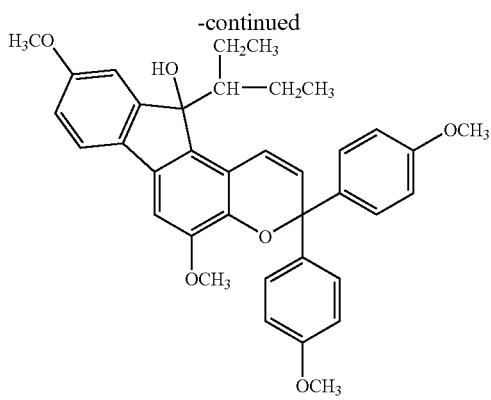

In order to express a desired color tone, the above-mentioned photochromic compounds can be used in a plurality of kinds being suitably mixed together.

The photochromic compound with which the photopolymerizable and curable composition of the invention is blended must be the one that favorably dissolves in the above-mentioned radically polymerizable monomer (A) from the standpoint of being highly densely dissolved. However, since the solubility differs depending upon the molecular structure of the photochromic compound, it is difficult to exclusively specify a desired photochromic compound from the standpoint of solubility. The solubility of the photochromic compound in the radically polymerizable monomer is usually about 1%. To more highly densely dissolve the photochromic compound, therefore, it becomes necessary to conduct some dissolving operation.

According to the present invention, the photochromic compound can be highly densely dissolved in the photopolymerizable and curable composition (radically polymerizable monomer) by, for example, a method of highly densely dissolving the photochromic compound in a nonprotonic polar solvent such as N-methylpyrrolidone followed by being mixed with the radically polymerizable monomer, or a method of once dissolving the photochromic compound highly densely in a low-boiling solvent such as dichloromethane or THF followed by being mixed with a polymerizable monomer and, then, distilling off the low-boiling solvent.

In order to obtain a curable composition containing the photochromic compound highly densely, further, there can be used, as a photochromic compound, a molecular compound comprising a particular chromene compound and an aromatic compound as constituent components. Here, the molecular compound stands for the one in which the same kind or different kinds of stable molecules are directly bonded to one another at a predetermined ratio, the bond among the constituent molecules forming the molecular compound being loose, the initial structure of the constituent elements and the nature of bond without much changing, and the constituent molecules can be relatively easily dissociated into their initial states. Usually, the molecular compound is a solid in which the constituent elements are arranged at a predetermined ratio. When the molecular compound is compared with the constituent molecules forming the compound, the two exhibit different physical properties such as different melting points, boiling points and solubilities.

There is no particular limitation on the above molecular compound that can be used in the present invention provided it comprises a particular chromene compound and an aromatic compound as constituent components, and the molecular compound may comprise several kinds of chromene compounds and several kinds of aromatic compounds. Further, the constituent molecules may be bonded together in any form, and there is no limitation on the composition ratio of the constituent molecules. As for the composition ratio, a particular ratio is selected for every combination of the chromene compound and the aromatic compound that are used. In the molecular compound (photochromic molecular compound) that could become a photochromic compound, however, the ratio is, usually, in a range of chromene compound:aromatic compound=5:1 to 1:10 (molar ratio).

There is no particular limitation on the chromene compound forming a kind of constituent molecules of the molecular compound that becomes the photochromic compound provided it is capable of forming a molecular compound with the aromatic compound. From the standpoint of easily forming the molecular compound with the aromatic compound, however, it is desired that the chromene compound has at least one substituted or unsubstituted phenyl group. In this chromene compound, the molecular compound is easily formed presumably due to π electron –π electron mutual action between the substituted phenyl group of the chromene compound and the aromatic compound.

In the present invention, among the chromene compounds having at least one substituted or unsubstituted phenyl group, it is particularly desired to use the one represented by the following formula (28) since it exhibits favorable photochromic properties,

(28)

wherein $R^{86}$ and $R^{87}$ are substituted or unsubstituted aryl groups, or substituted or unsubstituted aromatic heterocyclic groups, and a group represented by the following formula (29),

(29)

is a divalent condensed polycyclic organic group which may have a substituent, and is a group having a benzene ring condensed with a 2H-pyran ring in the above formula (28).

As the substituted aryl group or unsubstituted aromatic heterocyclic group $R^{86}$ or $R^{87}$ in the formula (28), there can be exemplified phenyl group, 1- or 2-naphthyl group, 2- or 3-furyl group, 2- or 3-thienyl group, and 2- or 3-pyrrolidyl group.

The aryl groups or the aromatic heterocyclic groups $R^{86}$ and $R^{87}$ may possess not only one substituent but may possess two or more substituents. There is no particular limitation on the kind thereof, either. Preferred substituents are, for example, alkyl group, alkoxy group, aralkoxy group, substituted or unsubstituted amino group, cyano group, substituted or unsubstituted aryl group, fluorine atom, chlorine atom, bromine atom, iodine atom, aralkyl group, trifluoromethyl group, trifluoromethoxy group, cyanomethyl group, arylsulfonyl group and alkylsulfonyl group. As the substituent for the substituted aryl group exemplified above, there can be exemplified those substituents exemplified above but excluding the substituted aryl group. As the substituent for the substituted amino group exemplified above, there can be exemplified, in addition to those substituents exemplified above, a substituted or unsubstituted heterocyclic group having a nitrogen atom as a hetero atom and is bonded to a phenyl group via the nitrogen atom, as well as a condensed heterocyclic group having an aromatic hydrocarbon ring or an aromatic heterocyclic ring condensed with the heterocyclic group. The heterocyclic ring may contain a hetero atom such as oxygen atom, sulfur atom or nitrogen atom in addition to the nitrogen atom bonded to the phenyl ring.

From the standpoint of photochromic properties, it is desired that either $R^{86}$ or $R^{87}$ in the formula (28) is a phenyl group having a substituted or unsubstituted amino group as a substituent. As the substituted or unsubstituted amino group, there can be preferably exemplified amino group; alkylamino groups such as methylamino group, ethylamino group, n-propylamino group, i-propylamino group, n-butylamino group and t-butylamino group; dialkylamino groups such as dimethylamino group, diethylamino group, di-n-propylamino group, di-i-propylamino group, di-n-butylamino group and di-t-butylamino group; arylamino groups such as phenylamino group and naphthylamino group; and diarylamino groups such as diphenylamino group and the like. As preferred examples of the substituted or unsubstituted amino group, there can be further exemplified a substituted or unsubstituted heterocyclic group having a nitrogen atom as a hetero atom and is bonded to the phenyl group through the nitrogen atom, a condensed heterocyclic group having an aromatic hydrocarbon ring or an aromatic heterocyclic ring condensed with the heterocyclic group and, particularly, a heterocyclic group or a condensed heterocyclic group having 2 to 10 carbon atoms, preferably, 2 to 6 carbon atoms, and constituting a heterocyclic group, such as morpholino group, piperidino group, pyrrolidinyl group, piperadino group, N-methylpiperadino group and indolinyl group.

In the above formula (28), the divalent group represented by the formula (29) is a condensed polycyclic organic group which may have a substituent, and is a group including a benzene ring condensed with a 2H-pyran ring in the formula (28). Though there is no particular limitation, the condensed polycyclic organic groups are preferably the ones represented by the following formulas (30), (31), (32) and (33) from the standpoint of obtaining excellent photochromic properties,

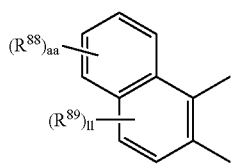

(30)

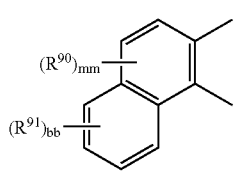

(31)

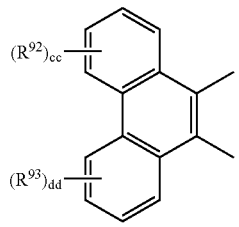

(32)

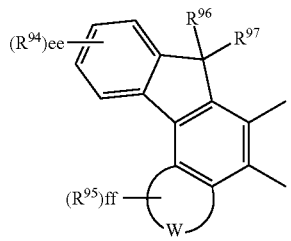

(33)

In the above formula (30), $R^{88}$ and $R^{89}$ are, independently from each other, hydrogen atoms, alkyl groups, alkoxy groups, aralkyloxy groups, aralkyl groups, carboxy groups, alkoxycarbonyl groups, aryloxycarbonyl groups which may have a substituent, aralkyloxycarbonyl groups, amino groups which may have a substituent, cyano groups, nitro groups, aryl groups which may have a substituent, halogen atoms, heterocyclic groups (which may have a substituent) having a nitrogen atom as a hetero atom and bonded to the ring of the condensed polycyclic organic group through the nitrogen atom, or condensed heterocyclic groups having an aromatic hydrocarbon ring or an aromatic heterocyclic ring condensed with the heterocyclic group. Further, "aa" representing the number of bonds of $R^{88}$ is an integer of 0 to 3, "11" representing the number of bonds of $R^{89}$ is an integer of 0 to 2, and when "aa" or "11" are not smaller than 2, $R^{88}$ or $R^{89}$ present in a plural number may be the same or different. The substituent in $R^{88}$ and $R^{89}$ is preferably at least one kind of substituent selected from the group consisting of alkyl group, alkoxy group, aryl group and halogen atom.

In the above formula (31), $R^{90}$ and $R^{91}$ are the same as those defined for $R^{88}$ and $R^{89}$ in the above formula (30), "mm" representing the number of bonds of $R^{90}$ is an integer of 0 to 2, "bb" representing the number of bonds of $R^{91}$ is an integer of 0 to 3, and when "mm" or "bb" are not smaller than 2, $R^{90}$ or $R^{91}$ present in a plural number may be different from each other.

In the above formula (32), $R^{92}$ and $R^{93}$ are the same as those defined for $R^{88}$ and $R^{89}$ in the above formula (30), "cc" and "dd" representing the numbers of bonds of $R^{92}$ and $R^{93}$ are integers of 0 to 3, and when "cc" and "dd" are not smaller than 2, $R^{92}$ or $R^{93}$ present in a plural number may be different from each other.

In the above formula (33), further, the ring represented by the following formula (34),

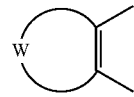

(34)

is an aromatic hydrocarbon ring or an unsaturated heterocyclic ring, $R^{94}$ and $R^{95}$ are the same as those defined for $R^{88}$ and $R^{89}$ in the above formula (30), "ee" and "ff" representing the numbers of bonds of $R^{94}$ and $R^{95}$ are integers of 0 to 3, and when "ee" or "ff" are not smaller than 2, $R^{94}$ or $R^{95}$ present in a plural number may be different from each other. $R^{96}$ and $R^{97}$ are, independently from each other, hydrogen atoms, hydroxyl groups, alkyl groups, alkoxy groups, aralkyloxy groups, aralkyl groups, carboxy groups, alkoxycarbonyl groups, aryloxycarbonyl groups, aralkyloxycarbonyl groups, substituted or unsubstituted amino groups, cyano groups, nitro groups, or substituted or unsubstituted aryl groups. Further, $R^{96}$ and $R^{97}$ may be bonded together to form an oxo group, a vinylene group which may have a substituent, a heterocyclic group containing 1 or 2 oxygen atoms and which may have a substituent, an aliphatic hydrocarbon cyclic group which may have a substituent, or a group represented by the following formula (35),

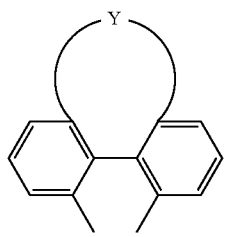

(35)

wherein a group represented by —Y— is the one expressed by the following formulas,

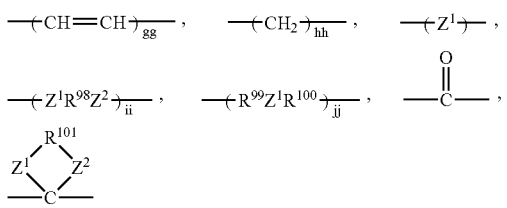

wherein $Z^1$ and $Z^2$ are, independently from each other, oxygen atoms or sulfur atoms, $R^{98}$, $R^{99}$, $R^{100}$ and $R^{101}$ are alkylene groups, and gg, hh, ii and jj are, respectively, integers of 1 to 4.

In the present invention, concrete examples of the chromene compound (i.e., chromene compound having at least one substituted or unsubstituted phenyl group) suited for forming the above-mentioned molecular compound include the following compounds,

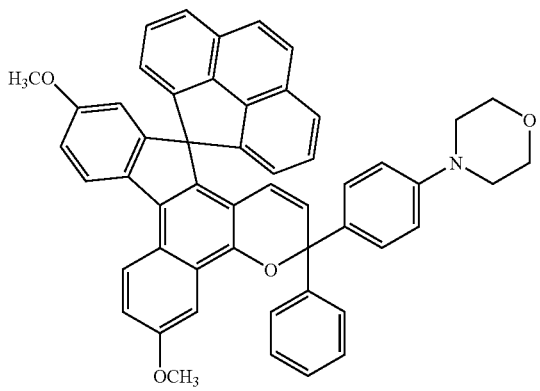

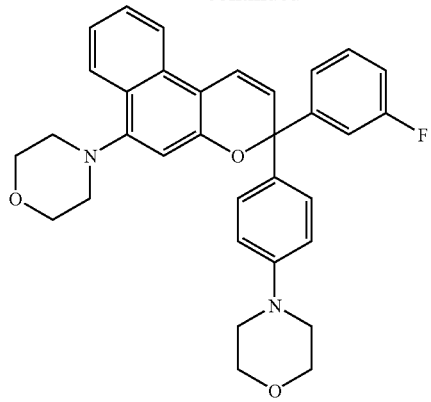

-continued

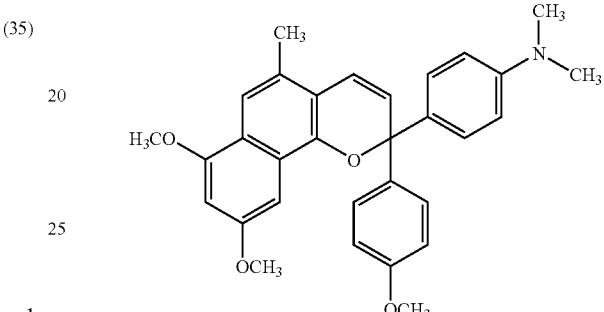

There is no particular limitation on the aromatic compound which constitutes the other molecules of the molecular compound provided it is capable of forming a molecular compound with the above-mentioned chromene compound. From the standpoint of easily forming the molecular compound, however, it is desired that the aromatic compound has a molecular weight of, particularly, 70 to 150 relative to the chromene compound having a molecular weight of 300 to 800. This is attributed to that the steric hindrance decreases with a decrease in the dimension of the aromatic compound which is, then, allowed to be located at places where above-mentioned π electron –π electron mutual action easily takes place. As such aromatic compounds, there can be used toluene, benzene, chlorobenzene, dichlorobenzene, naphthalene, thiophene and pyrrole.

According to the present invention as will be comprehended from the foregoing description, the molecular compound used as the photochromic compound is a chromene compound having at least one substituted or unsubstituted phenyl group and, particularly, a molecular compound of a chromene compound having a molecular weight of 300 to 800 represented by the above formula (28) and an aromatic compound having a molecular weight of 70 to 150 from the standpoint of photochromic properties and easy synthesis.

(C) Photopolymerization Initiators.

In the present invention, a photopolymerization initiator (C) is blended for forming a high molecular weight film by polymerizing and curing the above-mentioned radically polymerizable monomer (A). As the photopolymerization initiator, there can be used a phosphorus-containing photopolymerization initiator.

As described already, the phosphorus-containing photopolymerization initiator cleaves upon reacting with active energy rays of wavelengths in a visible light region of not shorter than 400 nm in addition to the ultraviolet ray region, to initiate the radical polymerization reaction. As a result, the relative intensity profile is adjusted. Upon irradiating active energy rays having a decreased relative intensity in the ultraviolet ray region, therefore, the coated layer of the polymerizable composition containing a photochromic compound at a high concentration can be uniformly polymerized and cured up to the interior thereof without deteriorating the photochromic compound. After cleaved, further, the phosphorus-containing photopolymerization initiator no longer absorbs visible light due to its own photo-bleaching effect. Therefore, the reaction can be initiated successively even in the direction of depth of the coating layer. In this respect, the phosphorus-containing photopolymerization initiator is very advantageous for homogeneously curing the coated layer of polymerizable composition up to the interior.

As the phosphorus-containing photopolymerization initiator according to the present invention, there can be used any known compound and, particularly, at least one of a monoacylphosphine oxide compound or a bisacylphosphin oxide compound from the standpoint of their particularly excellent internally curing property.

As the monoacylphosphine oxide compound, there can be used the one represented by the following formula (36),

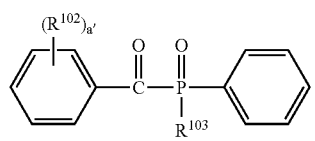
(36)

wherein $R^{102}$ may be the same or different, and are methyl groups, methoxy groups or chlorine atoms, a' is 2 or 3, and $R^{103}$ is a phenyl group or a methoxy group, such as 2,6-dimethylbenzoyldiphenylphosphine oxide, 2,4,6-trimethylbenzoyldiphenylphosphine oxide, 2,6-dichlorobenzoyldiphenylphosphine oxide, or 2,6-dimethoxybenzoyldiphenylphosphine oxide.

As the bisacylphosphine oxide compound, there can be used the one represented by the following formula (37),

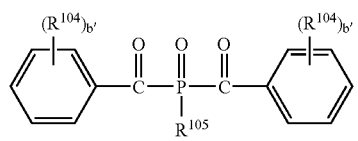
(37)

wherein $R^{104}$ may be the same or different, and are methyl groups, methoxy groups or chlorine atoms, b' is 2 or 3, and $R^{105}$ is a 2,4,4-trimethylpentyl group, such as bis(2,6-dimethoxybenzoyl)-2,4,4-trimethylpentylphosphine oxide, bis(2,6-dimethylbenzoyl)-2,4,4-trimethylpentylphosphine oxide, bis(2,4-6-trimethylbenzoyl)-2,4,4-trimethylpentylphosphine oxide, bis(2,6-dichlorobenzoyl)-2,4,4-trimethylpentylphosphine oxide, bis(2,4,6-trimethylbenzoyl)-phenylphosphine oxide, and bis(2,4,6-trimethoxybenzoyl)-phenylphosphine oxide.

In the present invention, the above-mentioned phosphorus-containing photopolymerization initiators can be used in one kind or in a combination of two or more kinds. Further, since the above-mentioned photochromic compound is blended at a high concentration, the phosphorus-containing photopolymerization initiator is blended in an amount in a range of 0.0 to 10 parts by weight, particularly, 0.05 to 5 parts by weight and, most particularly, 0.1 to 1 part by weight per 100 parts by weight of the above-mentioned radically polymerizable monomer (A).

In the present invention, further, there can be used any other photopolymerization initiators in addition to the phosphorus-containing photopolymerization initiator together with the above-mentioned phosphorus-containing photopolymerization initiator. Namely, other photopolymerization initiators trigger the initiation reaction upon the irradiation with ultraviolet rays and are, hence, capable of effectively curing the surface of the coated layer of the curable composition without affected by oxygen even when the curing is conducted in an atmosphere containing trace amounts of oxygen (several tens to several hundreds of ppm). By using the phosphorus-containing photopolymerization initiator and other photopolymerization initiators in combination, therefore, it is allowed to form a photochromic high molecular weight film that is homogeneously cured from the surface up to the interior thereof. This expands the allowable range of oxygen concentration in the atmosphere in which the curing by polymerization is conducted. Accordingly, the atmosphere can be adjusted such as substitution with nitrogen under mild conditions, whereby the curing by polymerization is completed within short periods of time, the curable composition applied onto the substrate is effectively prevented from dripping, which is very advantageous for preventing the dispersion in the thickness of the photochromic high molecular weight film and for preventing the occurrence of wrinkles. This is also advantageous for enhancing the hardness on the surface of the high molecular weight film and the adhesion between the high molecular weight film and the substrate or the hard coated layer.

As the photopolymerization initiators other than the above phosphorus-containing photopolymerization initiators, there can be exemplified the compounds represented by the following general formula (38),

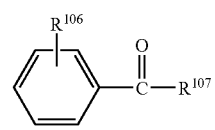
(38)

wherein $R^{106}$ is a hydrogen atom, a chlorine atom, a methyl group, an ethyl group, a propyl group, a methoxy group, an ethoxy group, a phenyl group, a methyl ester group, a methylthio group, a morpholino group or a 2-hydroxyethoxy group, $R^{107}$ is a phenyl group which may have a substituent, or a 1-hydroxy-cyclohexyl group, or represented by the following formula (39),

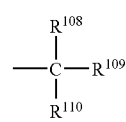
(39)

wherein $R^{108}$, $R^{109}$ and $R^{110}$ are, independently from each other, hydrogen atoms, chlorine atoms, methyl groups, ethyl groups, propyl groups, butyl groups, methoxy groups, ethoxy groups, propoxy groups, butoxy groups, phenyl groups which may have a substituent, benzyl groups which may have a substituent, hydroxyl groups, morpholino groups, N,N-dimethylamino groups, methyl ester groups or ethyl ester groups.

Concrete examples of the other photopolymerization initiator represented by the above formula (38) include benzophenone, methyl orthobenzoylbenzoate, orthobenzoylbenzoic acid, 4-benzoyl-4'-methyldiphenyl sulfide, 2,2-dimethoxy-1,2-diphenylethane-1-one, 2-benzyl-2-dimethylamino-1-(4-morpholinophenyl)-butanone-1,2-methyl-1-[4-(methylthio)phenyl]-2-morpholinopropane-1-one, 1-hydroxy-cyclohexyl-phenyl-ketone, 1-[4-(2-hydroxyethoxy)-phenyl]-2-hydroxy-2-methyl-1-propane-1-one, 2-hydroxy-2-methyl-1-phenyl-propane-1-one, 4-phenylbenzophenone, hydroxybenzophenone, 3,3'-dimethyl-4-methoxybenzophenone, benzoin, benzoinmethyl ether, benzoinethyl ether, benzoinisopropyl ether, benzoinisobutyl ether, 4-phenoxydichloroacetophenone, 4-t-butyl-dichloroacetophenone, 4-t-butyl-trichloroacetophenone, diethoxyacetophenone, 1-(4-isopropylphenyl)-2-hydroxy-2-methylpropane 1-one, 1-(4-dodecylphenyl)-2-hydroxy-2-methylpropane-1-one, and 4-(2-hydroxyethoxy)-phenyl(2-hydroxy-2-propyl)ketone, which may be used in one kind or in a combination of two or more kinds.

In addition to the compounds represented by the above general formula (38), there can be further used benzophenol, acetophenone, 4,4'-dichlorobenzophenone, methylphenylglyoxylate, thioxanthone, 2,4-dimethylthioxanthone, 2-methylthioxanthone, 2-chlorothioxanthone, diisopropylthioxanthone, 2,4-diethylthioxanthone, 2,4-dichlorothioxanthone, 2-isopropylthioxanthone, bis($\eta^5$-2,4-cyclopentadiene-1-il)-bis(2,6-difluoro-3-(1H-pyrrole-1-il)-phenyl)titanium, 3,3',4,4'-tetra(t-butylperoxycarbonyl)benzophenone, camphorquinone, dibenzosuberone, 2-ethylanthraquinone, 4',4"-diethylisophthalophenone, 9,10-phenanthrenequinone, and 1-phenyl-1,2-propanedion-2(O-ethoxycarbonyl)oxime, as the above-mentioned other photopolymerization initiators in one kind or in a combination of two or more kinds.

The photopolymerization initiators other than the above-mentioned phosphorus-containing photopolymerization initiators are blended usually in amounts in a range of 0.01 to 10 parts by weight, preferably, 0.01 to 4 parts by weight, more preferably, 0.05 to 4 parts by weight and, most desirably, 0.1 to 1 part by weight per 100 parts by weight of the above-mentioned radically polymerizable monomer (A). The blending ratio of the phosphorus-containing photopolymerization initiators and the other photopolymerization initiators differs depending upon the concentration of the photochromic compound in the polymerizable composition and cannot be exclusively specified. However, since the phosphorus-containing photopolymerization initiators have higher sensitivity and higher activity than those of the other photopolymerization initiators, it is desired that the ratio of phosphorus-containing photopolymerization initiators/other photopolymerization initiators (weight ratio) is 1/1 to 1/20 and, preferably, 1/1 to 1/4. Further, the total amount of the phosphorus-containing photopolymerization initiators and other photopolymerization initiators is in a range of 5 to 50 parts by weight and, particularly, 5 to 20 parts by weight per 100 parts by weight of the photochromic compound (B) from the standpoint of preventing the photochromic compound from being deteriorated.

(Other Blending Agents)

In addition to the above-mentioned components (A) to (C), a variety of additives can be suitably added to the photopolymerizable and curable composition used in the present invention under the condition in which, for example, the concentration of the photochromic compound (B) lies within the above-mentioned range. For example, there can be added such additives as surfactant, antioxidant, radical-trapping agent, ultraviolet-ray stabilizer, ultraviolet-ray absorber, parting agent, coloring-preventing agent, antistatic agent, fluorescent dye, dye, pigment, perfume and plasticizer in order to prevent the photochromic high molecular film from becoming yellow and to improve the forming property, light resistance of the photochromic compound, color-developing rate and fading rate.

The surfactant may be any one of the nonionic type, anionic type or cationic type. From the standpoint of solubility in the radically polymerizable monomer (A), however, it is desired to use the nonionic surfactant. Concrete examples of the preferred nonionic surfactant include sorbitan fatty acid ester, glycerin fatty acid ester, decaglycerin fatty acid ester, propylene glycol pentaerythritol fatty acid ester, polyoxyethylenesorbitan fatty acid ester, polyoxyethylenesorbit fatty acid ester, polyoxyethylene glycerin fatty acid ester, polyethylene glycol fatty acid ester, polyoxyethylenealkyl ether, polyoxyethylenephytosterol phytostanol, polyoxyethylenepolyoxypropylenealkyl ether, polyoxyethylenealkylphenyl ether, polyoxyethylene castor oil, cured castor oil, polyoxyethylenelanolin lanolinalcohol bee wax derivative, polyoxyethylenealkylamine fatty acid amide, polyoxyethylenealkylphenylformaldehyde condensate, and single chain polyoxyethylenealkyl ether. These surfactants can be used in one kind or in a combination of two or more kinds. It is desired that the amount of addition of the surfactant is in a range of 0.1 to 20 parts by weight per 100 parts by weight of the radically polymerizable monomer (A).

As the antioxidant, radical-trapping agent, ultraviolet-ray stabilizer and ultraviolet-ray absorber, there can be used hindered amine photo-stabilizer, hindered phenol antioxidant, phenolic radical-trapping agent, sulfur-containing antioxidant, benzotriazole compound and benzophenone compound in one kind or in combination. It is desired that the antioxidant, radical-trapping agent, ultraviolet-ray stabilizer and ultraviolet-ray absorber are added in amounts in a range of 0.001 to 20 parts by weight per 100 parts by weight of the whole polymerizable monomers.

In order to prevent the photochromic compound from being deteriorated at the time of curing the photopolymerizable and curable composition or to improve the light resistance of the cured material thereof (photochromic high molecular weight film), it is desired to use the hindered amine photo-stabilizer among the above-mentioned various additives. As the hindered amine photo-stabilizer which particularly, effectively prevents the deterioration of the photochromic compound, there can be used a bis(1,2,2,6,6-pentamethyl-4-piperidyl)sebacates, Adecastub LA-52, LA-62, LA-77 and LA-82 manufactured by ASAHI DENKA Co., LTD. The above hindered amine photostabilizer is added in an amount in a range of 0.001 to 20 parts by weight, preferably, 0.1 to 10 parts by weight and, most preferably, 1 to 10 parts by weight per 100 parts by weight of the radically polymerizable monomer (A).

According to the present invention, unlike the above-mentioned photopolymerization initiator, it is also allowable to blend a radical polymerization initiator (heat radical polymerization initiator) that generates radicals upon heating. The heat radical polymerization initiator is preferably the one that initiates the radical polymerization at a temperature at which the substrate is not thermally deformed, as exemplified by diacyl peroxides such as benzoyl peroxide, p-chlorobenzoyl peroxide, decanoyl peroxide, lauroyl peroxide and acetyl peroxide; peroxy esters such as t-butylperoxy-2-ethyl hexanoate, t-butylperoxy dicarbonate, cumylperoxy neodecanoate, and t-butylperoxy benzoate; percarbonates such as diisopropylperoxy dicarbonate, di-2-ethylhexylperoxy dicarbonate, and di-sec-butyloxy carbonate; and azo compounds such as 2,2'-azobisisobutyronitrile, 2,2'-azobis(4-dimethylvaleronitrile), 2,2'-azobis(2-methylbutyronitrile), and 1,1'-azobis(cyclohexane-1-carbonitrile), which may be used in one kind or in a combination of two or more kinds.

The amount of use of the heat radical polymerization initiators varies depending upon the polymerization conditions, kind of the initiator, kind and composition of the radically polymerizable monomer, kind, amount of addition and composition of the photopolymerization initiator used in combination as an initiator, and cannot be exclusively determined. Usually, however, the heat radical polymerization initiator is used in an amount in a range of 0.001 to 10 parts by weight per 100 parts by weight of the radically polymerizable monomer (A).

(Preparation of the Photopolymerizable and Curable Composition)

There is no particular limitation on the method of preparing the above-mentioned photopolymerizable and curable composition. Namely, predetermined amounts of components are weighed and mixed to easily prepare the photopolymerizable and curable composition. There is no particular limitation on the order of adding the components; i.e., all components may be added simultaneously, or the radically polymerizable monomers (A) only may be mixed in advance followed by the addition and mixing of the photochromic compound (B) and other additives (such as just before being polymerized).

When the photopolymerizable and curable composition contains the amine compound and at least one compound among the epoxy monomer, silyl monomer and isocyanate monomer, it is desired that the amine compound is packaged separately from the photopolymerizable composition which contains at least one of the epoxy monomer, silyl monomer or isocyanate monomer from the standpoint of preservation stability, and these compounds are mixed together at the time of use. In this case, the other components may be suitably distributed into the above two packages.

(Pretreatment of the Substrate)

In the present invention, the above photopolymerizable and curable composition is applied onto the curved surface of the substrate to form a coated layer which is, then, polymerized and cured to thereby form a photochromic high molecular weight film. Prior to the application, however, it is desired to pre-treat the substrate to improve the applicability and the adhesion of the photopolymerizable and curable composition onto the substrate.

As the pre-treatment, there can be exemplified a chemical treatment by using a basic aqueous solution or an acidic aqueous solution, a polishing treatment by using a polishing agent, a plasma treatment by using an atmospheric-pressure plasma and a low-pressure plasma, a corona discharge treatment, and a UV ozone treatment. From the standpoint of adhesion between the substrate and the coated layer, however, the atmospheric-pressure plasma treatment is preferred. The atmospheric-pressure plasma treatment referred to here is a plasma treatment method that is usually conducted under a condition of a pressure higher than that of the low-pressure plasma treatment. While the low-pressure plasma treatment is conducted under a pressure of about 1 Torr, the atmospheric-pressure plasma treatment is conducted under a pressure higher than the above pressure.

The atmospheric-pressure plasma treatment is carried out in a gaseous atmosphere such as of the air, nitrogen, oxygen, hydrogen, carbon dioxide, carbon monoxide, sulfur dioxide, argon, helium, neon, ammonia, chlorine, nitrogen monoxide, nitrogen dioxide or freon gas such as $CF_4$ or $C_2F_6$. From the standpoint of easy handling and cost, however, it is desired that the atmospheric-pressure plasma treatment is conducted in the air or in a nitrogen atmosphere. In order to improve the adhesion based on the atmospheric-pressure plasma treatment, further, it is desired that the gas that is used has a relative humidity of not higher than 80%RH and, particularly, not higher than 40%RH at 24° C.

Though there is no particular limitation, it is desired that the temperature of atmosphere in the atmospheric-pressure plasma treatment is preferably in a range of from −5° C. to 100° C. and, more preferably, from 5° C to 60° C.

Though there is no particular limitation on the method of irradicating the plasma in the atmospheric-pressure plasma treatment, it is desired to employ the following methods:

(1) Set the substrate on a spin-coating device and irradiate it with a plasma while rotating the substrate;
(2) Set the substrate under a fixed plasma irradiation portion, and move the substrate automatically or by hand back and forth, and right and left to homogeneously treat the substrate surface with the plasma; or
(3) Secure the substrate, and move the plasma irradiation portion automatically or by hand back and forth, and right and left to homogeneously treat the substrate surface with the plasma.

In the atmospheric-pressure plasma treatment, a mesh-like sheet of a metal or an alloy such as iron, copper, aluminum or stainless steel (SUS) may be inserted between the substrate and the plasma irradiation portion. By using the mesh-like sheet, the surface of the substrate is less deteriorated by electric discharge or heat during the atmospheric-pressure plasma treatment; i.e., the atmospheric-pressure plasma treatment is efficiently conducted without deteriorating the surface of the substrate. The method of using the mesh is particularly effective when there is used a substrate of a plastic resin. When the mesh-like sheet is used, further, a relatively strong adhesion is obtained without the step of washing with water or an organic solvent after the atmospheric-pressure plasma treatment as will be described later.

After the atmospheric-pressure plasma treatment is conducted, the photopolymerizable and curable composition may be directly applied. Preferably, however, the photopolymerizable and curable composition is applied after the surface (curved surface) of the substrate put to the atmospheric-pressure plasma treatment is washed with a solvent (hereinafter referred to as washing solvent). Due to this washing, a reliable adhesion is easily accomplished between the substrate surface and the coated layer. The washing with the washing solvent is particularly effective when the above-mentioned metallic mesh-like sheet is not used in the atmospheric-pressure plasma treatment.

As the washing solvent, there can be used water; alcohols such as methanol, ethanol, isopropanol, 1-butyl alcohol and 2-butyl alcohol; ethers such as tetrahydrofuran, dioxane and diethyl ether; esters such as methyl acetate and ethyl acetate; and other organic solvents such as acetonitrile, acetone, hexane and toluene, in a single kind or being mixed together in two or more kinds. It is desired to use water or a mixed solvent of water and an organic solvent from the standpoint of improving the adhesion. In particular, it is most desired to use water since the adhesion can be increased maintaining a very good reproduceability and, besides, the drained water can be very easily treated.

When the mixed solvent of water and an organic solvent is used, it is particularly desired if the organic solvent and water are in a state of being homogeneously mixed together. To homogeneously mix water and the organic solvent, it is desired to use, as the organic solvent, a water-soluble organic solvent which will be mixed with water at normal temperature at any ratio, such as methanol, ethanol or acetone. It is further desired that a mass ratio of water/organic solvent is in a range of 100/0 to 1/99 and, more preferably, 100/0 to 15/85.

As an organic solvent for washing, there can be used a commercially available industrial solvent without any refining. Further, as water, there can be used city water, ion-exchanged water, distilled water or pure water.

The temperature of the washing solvent may differ depending upon the substrate, water used for the washing, kind of the organic solvent or a mixing ratio thereof, but is desirably in a range of −5 to 100° C. and, more preferably, 5 to 80° C.

The substrate after treated with the plasma can be washed by using the above-mentioned washing solvent based on widely known methods, such as:

(1) A cloth impregnated with a suitable amount of washing solvent is used to wipe the surface of the substrate that has been put to the atmospheric-pressure plasma treatment;
(2) The washing solvent is poured into a container and in which the substrate put to the atmospheric-pressure plasma treatment is immersed and is washed with ultrasonic waves; or
(3) The substrate put to the atmospheric-pressure plasma treatment is set on the spin-coating device, and a suitable amount of the washing solvent is applied (dropped) onto the surface of the plastic substrate which is, then, rotated.

Though there is no particular limitation, it is desired that the number of times of washing is not larger than 10 times and is in a range of 1 to 5 times from the standpoint of productivity. Further, the substrate put to the atmospheric-pressure plasma treatment may be washed by two or more kinds of methods among the above-mentioned methods (1) to (3). When the washing is effected a plurality of number of times, the washing solvent may be differed for every washing. The washing time differs depending upon the substrate that is used, kind of the washing solvent, amount and temperature thereof, and the washing method but is, usually, in a range of from 3 seconds to 10 minutes.

In the present invention, the above-mentioned various pretreatments can be effected in combination. Among them, the pretreatment in combination with the alkali treatment is particularly effective in further improving the adhesion between the substrate and the coated layer. A preferred combination of the pretreatments may be a method of treating the substrate with an alkaline solution before or after the plasma treatment or the corona discharge treatment, or before or after the polishing treatment using a polishing agent. Here, however, the treatment with alkali is desirably conducted after the plasma treatment, corona discharge treatment or polishing treatment. The alkaline solution is preferably a sodium hydroxide aqueous solution or a potassium hydroxide aqueous solution. The concentration of the hydroxide is preferably 5 to 30% by weight. The treatment temperature may be suitably determined by taking the heat resistance of the substrate into consideration but is, preferably, in a range of 20 to 60° C. The treatment is conducted by immersing the substrate in the alkaline solution or by conducting an ultrasonic washing while immersing the substrate in the alkaline solution. The treating time differs depending upon the treating conditions but is, preferably, in a range of from 1 minute to 1 hour and, more preferably, from 5 to 15 minutes. The alkaline solution may further be for example, water, a mixed solution of alcohol solvents, or an alcohol solution in addition to aqueous solutions. The alcohol that is used may be a lower alcohol such as methanol, ethanol or isopropyl alcohol. There may be further added a small amount of an organic base such as 1-methyl-2-pyrrolidone as an additive in an amount of 1 to 10 parts by weight per 100 parts by weight of the alkali solution. After the treatment with the alkali, the substrate may be rinsed with water such as pure water, ion-exchanged water or distilled water and may, then, be dried.

(Application and Curing of the Photopolymerizable and Curable Composition)

After the substrate is pretreated, the above-mentioned photopolymerizable and curable composition is applied onto the curved surface of the substrate to form a coated layer. Here, the application is conducted by known means such as spin-coating, spray coating, dip coating, or dip spin-coating. The amount of application, i.e., the thickness of the coated layer of the photopolymerizable and curable composition may be suitably determined depending upon the thickness after cured, i.e., depending upon the desired thickness of the photochromic high molecular weight film. When it is intended to increase the thickness of the coated layer (e.g., to be not smaller than 10 μm), the ratio of blending the polymerizable components such as radically polymerizable monomers may be suitably selected, and the viscosity (25° C.) of the photopolymerizable and curable composition may be selected to lie in a range of 20 to 500 cp, particularly, 50 to 300 cp and, more particularly, 60 to 200 cp. When the viscosity is low, the photopolymerizable and curable composition cannot be homogeneously applied and, further, tends to be dripped. To obtain a coating of a thickness of, for example, not smaller than 10 μm by applying the photopolymerizable and curable composition having the above viscosity onto the substrate, it is desired to employ the spin-coating method. In this case, the thickness of the coating tends to increase at the peripheral edge of the substrate. As shown in FIG. 1, therefore, the excess of liquid of the photopolymerizable and curable composition is desirably removed from the peripheral edge of the substrate during the spin-coating operation by using a spatula or the like. By removing the excess of liquid as described above, the peripheral edge of the cured film becomes more uniform, the film thickness becomes more uniform in the region other than the peripheral edge, and a value $\Delta W/W_{av}$ can be lowered to be 0.03 or less in the above region. In connection with this, the area of the region can be expanded where the uniformity of the film thickness as expressed by $\Delta W/W_{av}$ is not larger than 0.07 (in other words, the peripheral edge region where $\Delta W/W_{av} > 0.07$ can be decreased).

FIG. 1 schematically illustrates a state where the liquid (photopolymerizable and curable composition) staying at an end portion of the substrate 3 (though the substrate 3 has curved surfaces, FIG. 1 illustrates a disk-like one for simplicity) is being removed from the upper side thereof by bringing the lower end 2 of the spatula 1 into contact with the liquid while rotating the substrate 3.

Figure 2:
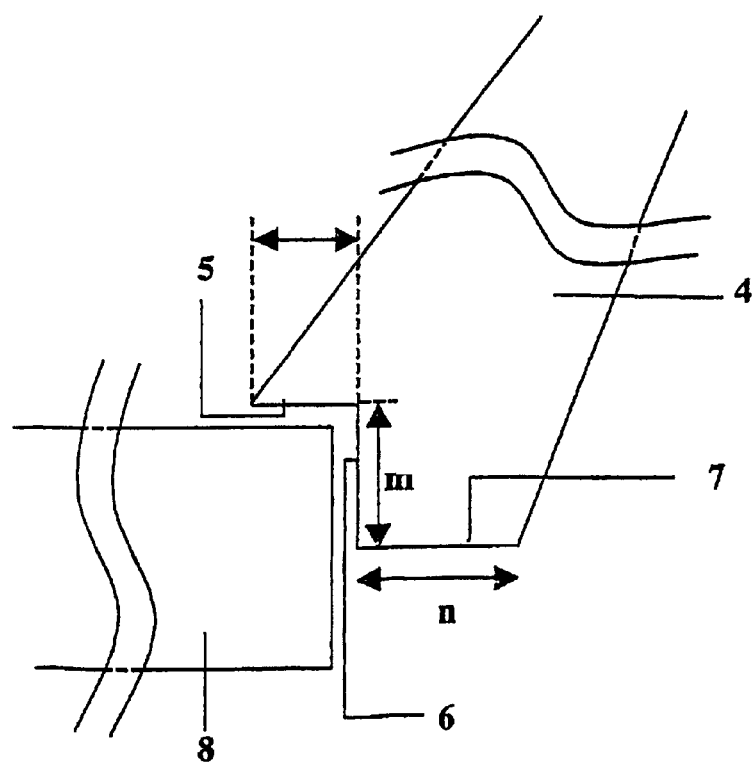
FIG. 2 is a view illustrating a portion of FIG. 1 on an enlarged scale.

There is no particular limitation on the shape of the spatula that is used provided it is of a structure capable of removing or reducing the pool of liquid of the photopolymerizable and curable composition staying at the edge portion of the substrate after the spin-coating. However, a desired shape is as exemplified in FIG. 2 which is a view illustrating a portion of FIG. 1 on an enlarged scale, and illustrates the structure of the lower end 2 of the spatula 1 of FIG. 1. The spatula 4 shown in FIG. 2 (corresponds to the spatula 1 shown in FIG. 1) has a notch formed at the lower end thereof in a shape corresponding to the peripheral edge of the substrate 8, and a side 5 of the notch is of a shape adapted to the curved surface of the substrate (FIG. 2 illustrates a flat surface for simplicity) and a side 6 of the notch is of a shape adapted to the shape of edge of the substrate 8. Formation of the notch of the above shape makes it possible to remove the pool of liquid from the surface of the substrate maintaining a predetermined width from the peripheral edge of the substrate, as well as to scratch off the photopolymerizable and curable composition adhered onto the side surface of the substrate contributing to improving the appearance of the substrate after finished. The lower end 7 of the spatula 4 does not come into direct contact with the substrate, but may be suitably formed to maintain strength of the spatula 4 when the substrate is being rotated.

There is no particular limitation on the size of the spatula 4, and any size may be employed provided it does not cause any problem on the structure or operation of the device. A preferred size may be such that the body of the spatula 4 has a length of 1 to 30 cm and, more preferably, 3 to 20 cm. There is no particular limitation, either, on the size of the notch portion of the spatula 4. Here, however, the length (1) of the side 5 determines a range for removing the pool of liquid and is, usually, 0.5 to 5 mm and, desirably, 0.8 to 3 mm. There is no particular limitation, either, on the length (m) of the side 6; i.e., the length (m) may be equal to, or smaller than, the height (thickness) of the side surface of the substrate. Concretely speaking, the length (m) is, preferably, 1 to 15 mm and, more preferably, 1 to 10 mm. There is no particular limitation, either, on the length (n) of the lower end 7 of the spatula 4. Desirably, however, the length (n) is 0 to 50 mm and, preferably, 0 to 30 mm from the standpoint of mechanical strength and operability of the spatula 4 at the time of removing the excess of coating solution.

There is no particular limitation on the material of the spatula, and there can be used plastic resins such as (meth) acrylic resin, polyethylene terephthalate, polypropylene, polyethylene, (foamed) polystyrene, (foamed) polyurethane resin, epoxy resin, polyethylene terephthalate, polyvinyl chloride, polycarbonate, polyethylene tetrafluoride and silicone resin; metals such as stainless steel, aluminum, copper and iron; and rubbers such as styrene-butadiene rubber, polybutadiene rubber, isoprene rubber, silicone rubber or acrylic rubber. Among them, it is particularly desired to use plastic resins having flexibility and rubbers from the standpoint of intimate touch at the contact portion between the substrate and the spatula without scratching the surface of the substrate.

The spatula can be used in a manner as described below. Namely, after the photopolymerizable and curable composition is applied onto the surface of the substrate, the spatula is partly brought into contact with the peripheral edge on the surface of the substrate on where the photopolymerizable and curable composition is applied while the substrate is being rotated to effect the spin-coating, or the spatula is brought into contact with the whole surface of the substrate up to a suitable distance, for example, up to 5 mm from the peripheral edge on the surface of the substrate on where the photopolymerizable and curable composition is applied. As for a timing for separating the spatula from the substrate, it is desired that the spatula is maintained contacted to the substrate until just before the substrate ceases to rotate in order to remove the pool of liquid of the photopolymerizable and curable composition as much as possible from the peripheral edge of the substrate. Further, though not diagramed, when the spatula is to be brought into contact even with the side surface of the substrate, it is also allowed to remove the excess of photopolymerizable and curable composition adhered on the side surface of the substrate due to spin-coating. Therefore, improved appearance is obtained after the coated layer is cured by the photopolymerization or the like.

The coated layer of the photopolymerizable and curable composition is polymerized and cured by being irradiated with active energy rays which are so adjusted as to possess a particular relative intensity profile. In order to form a uniformly cured film while preventing the polymerization from being impaired by oxygen, it is desired that the curing by polymerization is conducted in a gaseous atmosphere having, preferably, a molecular oxygen concentration of not larger than 10,000 ppm and, particularly, not larger than 1,000 ppm. The oxygen concentration in the atmosphere is adjusted by substituting the atmosphere with an inert gas. The inert gas may be the one that is inert to the radicals without containing oxygen, and there can be used cheaply available nitrogen or an argon gas having a high substitution efficiency. It is desired that the oxygen concentration in the atmosphere is as small as possible so that the polymerization is impaired little. When the atmosphere is substituted, however, oxygen cannot be completely excluded, and molecular oxygen inevitably infiltrates in very small amounts. According to the present invention, however, use of a particular photopolymerization initiator permits an increase in the allowable concentration of oxygen, offering an advantage that the oxygen concentration can be easily adjusted to lie in the allowable range of concentration by substituting the atmosphere with an inert gas. Namely, the atmosphere can be substituted within a short period of time, which is very advantageous for shortening the production time and for preventing the dripping of the coating layer.

As the active energy ray for initiating the polymerization, there is used an ultraviolet ray or visible light inclusive of an ultraviolet-ray region. In order to form a homogeneous photochromic coating having a uniform thickness, however, it is necessary, according to the present invention, to irradiate active energy rays having a particular relative intensity profile. Namely, according to the production method of the present invention, the photopolymerizable and curable composition is cured by being irradiated with an active energy ray having a relative intensity profile of 0 to 5% of wavelength components of not shorter than 200 nm but shorter than 300 nm, 25 to 75% of wavelength components of not shorter than 300 nm but shorter than 400 nm, and 25 to 75% of wavelength components of not shorter than 400 nm but not longer than 500 nm. Here, the relative intensity of the active energy ray stands for a ratio of area intensities of the active energy rays in the wavelength regions of when the total area intensity of the active energy rays of the region of 200 to 500 nm is regarded to be 100%.

The relative intensities of the active energy rays are compared by dividing the wavelength region of 200 nm to 500 nm into three wavelength regions, i.e., not shorter than 200 nm but shorter than 300 nm (region A), not shorter than 300 nm but shorter than 400 nm (region B) and not shorter than 400 nm but not longer than 500 nm (region C). In this case, it is desired that the region A has a small intensity from the standpoint of suppressing the deterioration of the photochromic compound and accomplishing optical homogeneity of the obtained laminate. It is desired that the region B has a large intensity from the standpoint of highly decomposing the photopolymerizable initiator and highly polymerizing the radically polymerizable monomer. It is further desired that the region C has an intermediate intensity from the standpoint of highly decomposing the phosphorus-containing photopolymerization initiator. It is particularly important that the region A has a low intensity among them. When the curing by polymerization is conducted by the irradiation with the active energy ray having a large intensity in the region A, decomposition of the photopolymerization initiator is promoted near the surface of the coated layer, whereby a difference occurs in the rate of polymerization between the surface and the interior of the coated layer, forming an optically inhomogeneous photochromic high molecular film.

In the present invention, therefore, the active energy ray is so adjusted as to possess a relative intensity profile of 0 to 5% in the region A, 25 to 75% and, particularly, 50 to 75% in the region B, and 25 to 75%. and, particularly, 25 to 50% in the region C.

Further, it is particularly desired that the region B has a large relative intensity at, particularly, not shorter than 360 nm but shorter than 400 nm (region B') from the standpoint of uniformalizing the decomposition of the photopolymerization initiator between the surface and the interior of the coated layer and promoting the homogeneous polymerization. Concretely speaking, it is particularly desired that the relative intensity of the region B' is not smaller than 70% of the relative intensity of the region B as a whole and, further, that the relative intensity of the region B' is not smaller than 35% with respect to the relative intensity (100%) of the whole region of 200 nm to 500 nm.

In the present invention, the source of active energy ray irradiated for initiating the polymerization may be either a discharge source of light with electrodes or a discharge source of light without electrode provided it radiates an active energy ray of not shorter than 200 nm.

The discharge source of light with electrodes has a lamp that emits light when a voltage is applied to the electrodes, and its examples include ozone-less high pressure mercury lamp, ozone-containing high pressure mercury lamp, very high pressure mercury lamp, high pressure mercury lamp filled with a metal halide such as iron halide or gallium halide, sterilizer lamp, krypton arc lamp, carbon arc lamp, xenon lamp, tungsten lamp, metal halide lamp, indium lamp and thallium lamp. The discharge source of light without electrode has a lamp that emits light upon controlling the energy of microwaves without using electrode, and its examples include H bulb, H plus bulb, D bulb, V bulb, M bulb and Q bulb.

In the present invention, when the relative intensity profile of the active energy ray generated from the source of light satisfies the above-mentioned conditions, then, light from the source of light may be directly irradiated. When the active energy ray generated from the source of light does not assume the above-mentioned relative intensity profile, then, two or more rays may be used in combination, or a filter may be used, to adjust the rays so as to assume the relative intensity profile as described above.

Usually, the active energy ray emitted from the above source of light has a relative intensity profile of 10 to 50% of wavelength components of not shorter than 200 nm but shorter than 300 nm, 30 to 70% of wavelength components of not shorter than 300 nm but shorter than 400nm, and 20 to 60% of wavelength components of not shorter than 400 nm but not longer than 500 nm. Therefore, the relative intensities of the active energy ray from the source of light can be effectively controlled to lie within the above-mentioned range by decreasing the active energy ray in the region A. To decrease the active energy ray in the region A, the active energy ray emitted from the source of light should be passed through a filter. Any filter can be used without any limitation provided it is made of a material which decreases the intensity of active energy ray of wavelengths of shorter than a particular wavelength emitted from the source of light down to not more than 60% and, desirably, not more than 30% of the intensity of when not passed therethrough. For example, there can be used an ultraviolet-ray cut filter, a hard soda glass or a transparent material of a glass or a resin coated with an ultraviolet-ray cut film. As required, the filter may assume a frosted state on one surface or on both surfaces thereof. For example, to decrease the energy of active energy ray of shorter than 300 nm or shorter than 360 nm, there can be used a filter glass UV-30 (transmission limit wavelength for transmitting ultraviolet rays of 300 nm) or a filter glass UV-36 (transmission limit wavelength for transmitting ultraviolet rays of 630 nm). Here, the transmission limit wavelength stands for a word specified under JIS B7113, and means a wavelength located midway between a wavelength A at which the transmission factor of ray of light is 72% and a wavelength B at which the transmission factor is 5%.

In general, the source of light used for the photopolymerization is selected by taking into consideration the active wavelength of the polymerization agent that is used. In the present invention, however, it is desired to use a source of light with electrodes, such as metal halide lamp or ozone-less high pressure mercury lamp or an electrode-less lamp such as D bulb, V bulb, M bulb or Q bulb among the above-mentioned various sources of light from the standpint of lowering the relative intensity of the active energy ray in the region A described above and easily adjusting the wavelength profile to lie within the above-mentioned range by using a filter that is easily available. It is particularly desired to use the metal halide lamp, ozone-less high pressure mercury lamp or D bulb from the standpoint of lowering the relative intensity of the active energy ray in the region A and increasing the relative intensity of the active energy ray in the region B (main spectrum of the source of light is not shorter than 300 nm but is shorter than 400 nm).

In order to obtain an optically homogeneous laminate according to the present invention, it is necessary to control the relative intensities of the active energy rays to lie within a predetermined range as well as to prevent a rise in the temperature on the surface of the substrate during the curing treatment. Namely, the temperature on the surface of the substrate is controlled to be not higher than 100° C. and, particularly, not higher than 80° C. By irradiating the active energy rays while suppressing the temperature on the surface of the substrate to be not higher than a predetermined value, it is allowed to suppress the deformation of the substrate, to decrease a change in the degree of sphericity of the curved surface of the substrate before and after the formation of the high molecular weight film and to prevent a drop in the optical properties. A particularly distinguished effect is obtained when there is used a substrate having low Tg, such as polyurethane resin or polymethacrylic resin, or when there is used a thin substrate having a small thickness (e.g., not larger than 2 mm) at the center of curvature of the curved surface.

To maintain the temperature on the surface of the substrate within the above range, the ray of heat emitted from the source of light must be efficiently removed. For this purpose, there can be employed a method according to which a double tubular jacket is mounted to surround the source of light and pure water is permitted to flow into the jacket as represented by a water-cooled jacket system, a method according to which the source of light is surrounded by the Pyrex glass (registered trademark) obtained by vaporizing thin metal films in many layers to permit the transmission of infrared rays, and the substrate is irradiated with the reflected ultraviolet rays as represented by a cold mirror system, and a method that uses a heat ray cut filter. Among the above systems, it is desired to use a system that uses a heat ray cut filter from the standpoint of simplicity.

The heat ray cut filter stands for an optical filter having a function of suppressing the transmission of heat rays by absorbing or reflecting visible rays and infrared rays. In the present invention, the heat ray cut filter is disposed between the source of heat and the substrate to easily and efficiently suppress an increase in the temperature on the surface of the substrate during the curing. As the heat ray cut filter, there can be used the one having an average light transmission factor of not larger than 60% and, preferably, not larger than 30% in a region of wavelengths of 0.8 to 1 μm or a region of wavelengths of 3 to 5 μm.

As the material of the heat ray cut filter, there can be used any known material such as an inorganic material, an organic material or an inorganic/organic composite material without limitation. Among them, it is particularly desired to use an inorganic material from the standpoint of heat resistance. As the inorganic material, there can be exemplified a cold filter, an aluminum mirror, a quartz plate and a colored glass. Here, the cold filter stands for a glass plate such as of quartz on which a metal oxide is laminated in many layers by vacuum evaporation, the aluminum mirror stands for a mirror made of highly bright aluminum having a mirror surface exhibiting a high reflection factor, and the colored glass stands for a colored transparent glass comprising an iron-containing phosphate glass or a soda ash glass further containing trace amounts of iron, nickel, cobalt or selenium. The heat ray cut filter can be used in one kind or in a combination of a plurality of kinds. Among the above heat ray cut filters, it is particularly desired to use a colored glass on account of its large effect for suppressing a rise in the temperature on the surface of the substrate such as lens and a high transmission factor for the active energy rays of longer than 300 mn.

The thickness of the heat ray cut filter may be suitably selected by taking into consideration the heat ray cutting efficiency, and transmission factors in the ultraviolet-ray and visible light regions, but is, usually, 0.01 mm to 10 mm and, preferably, 0.1 to 5 mm.

In the present invention, the time for irradiating the active energy rays may be suitably selected depending upon the wavelength and intensity of the source of light and the shape of the lamp, but is, usually, 1 second to 10 minutes and, preferably, 10 seconds to 5 minutes. Though there is no particular limitation, it is desired that the intensity of irradiation, i.e., the intensity of active energy rays falling on the substrate is not larger than 30 mW/cm$^2$ and, particularly, not larger than 15 mW/cm$^2$ at a wavelength of 315 nm, 30 to 90 mW/cm$^2$ and, particularly, 30 to 70 mW/cm$^2$ at a wavelength of 365 nm, and 50 to 200 mW/cm$^2$ and, particularly, 70 to 150 mW/cm$^2$ at a wavelength of 405 nm. The distance of irradiation may be suitably selected depending upon the intensity of irradiation and the time of irradiation, but is, usually, 10 cm to 80 cm. The substrate receives less heat emitted from the source of light when the distance is increased from the source of light. It is, therefore, desired to use a source of light having an irradiation intensity which is as large as possible while diffusing heat from the source of light out of the system by using a fan, and to effect the irradiation at an irradiation distance of 40 to 80 cm. At the time of irradiation, further, the substrate is placed still, or the substrate is placed on a belt line and is irradiated one or more times.

The photochromic high molecular weight film is formed by polymerizing and curing the coated layer formed on the curved surface of the substrate by the irradiation with the active energy rays as described above. Here, when the photopolymerizable and curable composition is blended with the heat polymerization initiator or the above-mentioned epoxy monomer, silyl monomer or isocyanate monomer and a component such as amine compound that cures upon the polycondensation, the curing may, as required, be completed by effecting the heat polymerization after the irradiation with the active energy rays. At the time of heat polymerization, it is desired to heat the substrate at a temperature of 110 to 130° C. and, particularly, 110 to 120° C. for 30 minutes to 3 hours and, more desirably, 1 to 2 hours under the conditions where the substrate as a whole is evenly heated (this heating is conducted by using, for example, a batch-type oven) since good adhesion is accomplished due to thermal and chemical bonding between the substrate and the high molecular weight film. During the photo-curing by the irradiation with active energy-rays, the vicinity of the surface is not only locally heated but also produces a large stress due to the contraction by polymerization. In order to prevent the substrate from being deformed, therefore, the substrate must be maintained at a temperature which is not higher than 100° C. The heat polymerization, however, is free from the above, and there is no problem even when the substrate is heated at a temperature in excess of 100° C.

(Laminate)

Thus, according to the present invention, it is allowed to obtain a laminate having the photochromic high molecular weight film laminated on the curved surface of the substrate.

This laminate exhibits excellent optical properties with a small difference between the degree of sphericity of the curved surface of the substrate of before the photochromic high molecular weight film is formed and the degree of sphericity of the curved surface (surface of the high molecular weight film) of the laminate. Concretely speaking, a difference in the spherical refractive power on the above curved surface can be confined to lie in a range of smaller than ±0.5 diopers, preferably, smaller than ±0.1 diopters and, more preferably ±0.03 diopters. That is, the laminate of the invention maintains a high degree of optical properties possessed by the substrate (e.g., lens) without almost being impaired, and has the high molecular weight film formed on the surfaces thereof maintaining a uniform thickness as well as a very high degree of homogeneity over the whole high molecular weight film without substantially causing a change in the curvature before and after the formation of the high molecular weight film. That is, the high molecular weight film is homogeneous over the whole (central) region except the peripheral edge portions of the laminated surface. A difference ($\Delta W=W_{max}-W_{av}$ or $W_{av}=W_{min}$) between a maximum film thickness ($W_{max}$) or a minimum film thickness ($W_{min}$) and an average film thickness ($W_{av}$) is not larger than 7% ($\Delta W/W_{av}\cdot 0.07$), preferably, not larger than 5% ($\Delta W/W_{av}\cdot 0.05$) and, most preferably, not larger than 3% ($\Delta W/W_{av}\cdot 0.03$). In particular, a homogeneous high molecular weight film is formed even on a thin substrate having a small thickness (e.g., not larger than 2 mm) at the center of curvature of the curved surface.

Here, the (central) region excluding the peripheral edge portion of the high molecular weight film layer stands for a region (portion) on the inside of the peripheral edge of the high molecular weight film by a predetermined distance, and the area of that region (portion) is at least 70% and, particularly, at least 85% of the area of the whole surface of the laminate. When, for example, the substrate is circular or is nearly circular having a size of 60 mm to 80 mm in diameter as is generally employed for, for example, the spectacle lenses, the (central) region represents a portion which is on the inside from the peripheral edge by 6.5 to 4.9 mm and, particularly, by 3.1 to 2.3 mm. The above maximum film thickness ($W_{max}$), minimum film thickness ($W_{min}$) and average film thickness ($W_{av}$) are those values obtained by measuring the thicknesses at least at five different points (places).

The thickness of the high molecular weight film at the peripheral edge portion of the substrate may often increase in excess of 0.07 as expressed by the above relation $\Delta W/W_{av}$ particularly beyond the peripheral edge. In the spectacle lenses, however, the peripheral portions are generally removed at the time of machining the lenses to meet the shape of the spectacle frame, and there is quite no problem in practice.

In the laminate of the present invention produced by the above-mentioned method, the photochromic high molecular weight film formed on the curved surface of the substrate is as very thin as 1 to 100 μm. Therefore, formation of the high molecular weight film does not impair the properties (particularly, mechanical properties such as Rockwell hardness, and optical properties) of the substrate. Further, the photochromic high molecular weight film contains the photochromic compound at a concentration as high as 0.2 to 20% by weight and, hence, imparts photochromic properties to the substrate to a sufficient degree despite of its very small film thickness.

When the concentration of the photochromic compound in the high molecular weight film is increased to exceed 20% by weight, the photochromic compound tends to aggregate or breed out, and the obtained laminate exhibits deteriorated photochromic properties. When the concentration is smaller than 0.2% by weight, on the other hand, photochromic properties are not obtained to a sufficient degree even when the film thickness is increased to be 100 μm.

A preferred concentration of the photochromic compound in the high molecular weight film is related to the film thickness, and is desirably adjusted within the above-mentioned range by taking the photochromic properties (color density, light resistance and initial color) into consideration. For example, when the concentration is too small as compared to the film thickness, the color density decreases. Conversely, when the concentration is too high as compared to the film thickness, the initial color tends to become dense. In the applications of photochromic spectacle lenses, therefore, it is desired that the film thickness and the photochromic compound concentration are 20 to 50 μm and 2 to 7% by weight, preferably, 30 to 50 μm and 3 to 7% by weight.

The laminate having photochromic properties of the invention can be used as known optical parts in a variety of applications, such as transparent films, spectacle lenses, windowpanes of houses and automobiles, etc.

When the laminate of the invention is used as spectacle lenses (i.e., when the spectacle lens is used as the substrate and the photochromic high molecular weight film is formed on the surface thereof), it is desired that the refractive index of the high molecular weight film becomes nearly equal to the refractive index of the spectacle lenses. The refractive index is adjusted by adjusting the blending ratio of the radically polymerizable monomer (A) in the photopolymerizable and curable composition, and is, generally, so adjusted that the cured material (high molecular weight film) thereof exhibits a refractive index of about 1.48 to about 1.75.

When the photopolymerizable and curable composition is blended with the above-mentioned silyl monomer and/or isocyanate monomer as well as the amine compound, the high molecular weight film formed on the surfaces of the spectacle lenses (particularly, plastic spectacle lenses) exhibits a very high degree of adhesion to the spectacle lenses made of the substrate.

The laminate of the invention having the photochromic high molecular weight film can be directly used as the photochromic optical material. More preferably, however, the high molecular weight film is coated with a hard material. Being coated with the hard material, the photochromic optical material exhibits improved scratch resistance.

Any hard coating material can be used without limitation, such as a silane coupling agent, those comprising chiefly a sol of oxide of silicon, zirconium, antimony or aluminum, or a hard coating material comprising chiefly an organic high molecular weight material.

The surface coated with the hard material may be further subjected to the reflection prevention treatment by further coating the surface with a thin film of a metal oxide such as $SiO_2$, $TiO_2$ or $ZrO_2$ by vacuum evaporation or by applying thereon a thin film of an organic high molecular weight material, as well as to the antistatic prevention treatment and secondary treatment.

EXAMPLES

The invention will now be described by way of working Examples.
(1) Photochromic Compounds.
PC1: A compound of the following compound (A) and toluene at a molar ratio of 1:1.

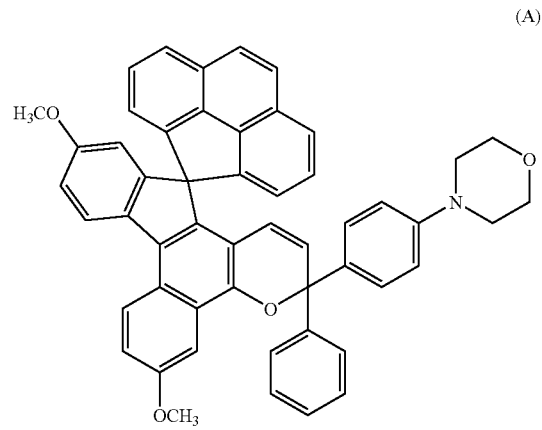 [SMILES: COc1ccc2c(c1)C1(c3c4c(c5cc(OC)ccc5c3-2)OC(c2ccccc2)(c2ccc(N3CCOCC3)cc2)C=C4)c2cccc3ccc4cccc1c4c23]

(A)

Preparation of PC1.

Green crystals of the above compound (A) were dissolved in 10 volume times as much of toluene while being heated, stirred at room temperature for 24 hours, recrystallized and were filtered. The obtained material was dried at 80° C. under a reduced pressure until there was no loss in weight to thereby obtain a yellowish powdery molecular compound. The melting point was measured to be 162° C. for the obtained molecular compound PC1 in contrast with 273° C. of the compound (A), from which it was confirmed that the molecular compound had been formed. The molar ratio to the toluene was found from $^1$H-NMR.

PC2: A compound of the following compound (B) and toluene at a molar ratio of 1:1.

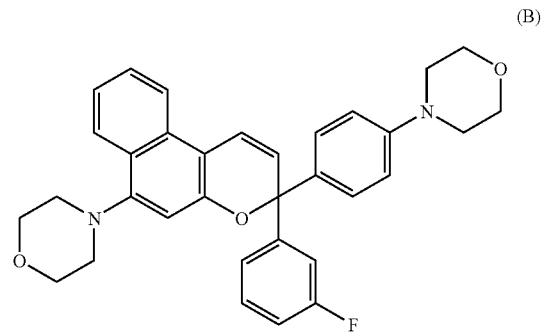 [SMILES: Fc1cccc(C2(c3ccc(N4CCOCC4)cc3)C=Cc3c(cc(N4CCOCC4)c4ccccc34)O2)c1]

(B)

Preparation of PC2.

Red crystals of the above compound (B) were dissolved in 10 volume times as much of toluene while being heated, stirred at room temperature for 24 hours, recrystallized and were filtered. The obtained material was dried at 80° C. under a reduced pressure until there was no loss in weight to thereby obtain a yellowish powdery molecular compound. The melting point was measured to be 113° C. for the obtained molecular compound PC2 in contrast with 185° C. of the compound (B), from which it was confirmed that the molecular compound had been formed. The molar ratio to the toluene was found from $^1$H-NMR.

PC3:

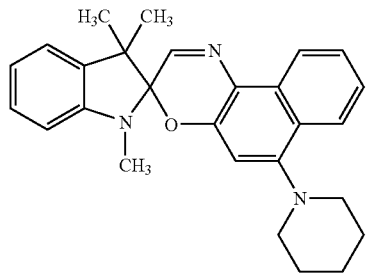

PC4:

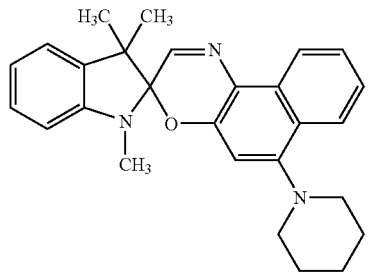

(2) Radically Polymerizable Monomers.
M1: 2,2-bis(4-methacryloyloxypolyethylene glycol phenyl) propane having an average molecular weight of 776
M2: Polyethylene glycol diacrylate (average molecular weight of 532)
M3: Trimethylolpropane trimethacrylate
M4: Polyesteroligomer hexaacrylate (EB-1830, manufactured by DAICEL UCB COMPANY LTD.)
M5: GMA: glycidyl methacrylate
M6: DPEHA: dipentaerythritol hexaacrylate
M7: Urethaneoligomer hexaacrylate (U-6HA, manufactured by Shin-Nakamura Kagaku Co.)
M8: γ-methacryloyloxypropyltrimethoxysilane
(3) Photopolymerization Initiators.
IN1: CGI184: 1-hydroxycyclohexylphenyl ketone
IN2: bis(2,6-trimethoxybenzoyl)-2,4,4-trimethylpentyl phosphinoxide
(4) Amine Compounds.
NMDEA: N-methyldiethanolamine
DMEMA: N,N-dimethylaminoethyl methacrylate
(5) Stabilizer.
LS765: bis(1,2,2,6,6-pentamethyl-4-piperidyl)sebacate
(6) Optical Materials.
CR$^{39}$ (allyl resin lens, refractive index=1.50)
MR (thiourethane resin lens, refractive index=1.60)

Example 1

The above radically polymerizable monomers were blended at a ratio shown in Table 1 to obtain a polymerizable composition.

To 100 parts by weight of the mixture of the above radically polymerizable monomers, there were added 2.7 parts by weight of the photochromic compound PC1, 1.5 parts by weight of PC2, 0.3 parts by weight of PC3, 0.3 parts by weight of PC4, as well as 0.375 parts by weight of the photopolymerization initiator IN1 and 0.125 parts by weight of IN2. As other additives, there were further added LS765 (5 parts by weight) as a photo-stabilizer and NMDEA (3 parts by weight), and the mixture was mixed to a sufficient degree. The kinematic viscosity of the mixed solution was measured by using a Cannon-Fenske viscometer in compliance with JIS K2283 at 25° C. By using the obtained kinematic viscosity and the specific gravity of the sample that had been measured in advance, the viscosity of the sample was measured according to the following formula, $$\text{Viscosity (cP)} = \text{kinematic viscosity (cSt)} \times \text{specific gravity (g/cm}^3\text{)}$$

to be 110 cp.

Then, the surface of a plastic lens MR having a center thickness of 1 mm, end thickness of 7 mm and a diameter of 75 mm was spin-coated with about 2 g of the mixed solution obtained by the above method by using a spin-coater 1H-DX2 manufactured by MIKASA Co. The spatula made of a polyurethane resin of a shape shown in FIG. 2 was maintained contacted to the lens during the spin-coating operation to remove an excess of the coating solution staying on the peripheral edge portion of the plastic lens. The spatula that was used possessed, in FIG. 2, a side 5 of a length l of 3 mm, a side 6 of a length m of 5 mm and a lower end portion 7 of a length n of 10 mm.

The film after spin-coated was cured by the photopolymerization under the conditions shown in FIG. 2. Namely, the lens of which the surface was coated was irradiated with light of an intensity of 80 mW/cm$^2$ of 405 nm on the surface of the lens by using the following electrode-less D bulb lamp (distance between the lens substrate and the source of light of 60 cm) in a nitrogen gas atmosphere (oxygen concentration of 800 ppm) by using a hard soda glass as an ultraviolet ray cut filter thereby to cure the film.

(Electrode-less D Valve Lamp)
Model, F300SQ-6 manufactured by Fusion UV Systems Japan Co.
Profile of intensities of 200 to 500 nm of the source of light:
200 to 300 nm: 16%
300 to 400 nm: 56%
400 to 500 nm: 28%
Profile of intensities of 200 to 500 nm of the source of light through the hard soda glass:
200 to 300 nm: 2%
300 to 400 nm: 64%
400 to 500 nm: 34%

After the curing, the temperature on the surface of the lens was measured by using a thermocouple to be a maximum of 80° C. Through the heat treatment in an oven heated at 110° C. for 1 hour, there was obtained a lens having a photochromic high molecular weight thin film laminated thereon. The plastic lens that was used was the one of which the surface had been subjected to the atmospheric pressure plasma treatment (plasma-forming gas of nitrogen) by using a plasma irradiator (ST-7000) manufactured by Keyence Co. and of which the surface had been reformed by being washed with hot water of 50° C.

The thus obtained lens having the photochromic high molecular weight film was evaluated by the methods described below.

The thus obtained lens having the photochromic high molecular film was evaluated by the methods described below.
(1) Color density (Abs.): A difference {ε(120)−ε(0)} was found between an absorbency {ε(120)} at a maximum absorption wavelength after irradiated with light for 120 seconds and an absorbency {ε(0)} at the above wavelength of the cured material in a state of not being irradiated with light, and was regarded as a color density. The higher this value, the more excellent the photochromic properties are.
(2) Fading rate (min.): After irradiated with light for 120 seconds, the irradiation of light was discontinued, and a time {t½ (min)} was measured until the absorbency of the cured material at the maximum wavelength dropped to one half the above difference {ε(120)−ε(0)}. The shorter this time, the more excellent the photochromic properties are.
(3) Developed color tone: A color was developed outdoors with sunlight to confirm the developed color tone by eyes.
(4) Durability: The following deterioration promotion testing was conducted to evaluate the durability of color developed by exposure. That is, the lens having the photochromic coating obtained above was subjected to the promoted deterioration for 200 hours by using a xenon weather meter X25 manufactured by Suga Shikenki Co. Then, the color density was evaluated before and after the testing to measure a color density (A0) before the testing and a color density (A200) after the testing, and a value {(A200/A0)×100} was regarded to be a residual rate (%) that served as an index of color development durability. The higher the residual rate, the larger the light resistance of color that is developed.
(5) Yellowness (YI): Yellowness of the lens sample prior to developing color was measured by using a color difference meter (SM-4) manufactured by Suga Shikenki Co. The larger the YI value, the stronger the degree of yellowness.
(6) Appearance: Appearance of the lens having the photochromic high molecular weight film laminated thereon was evaluated concerning the following items. An open circle represents that the items were all acceptable as a result of inspection. Faults that were found were listed in Table 3.
① Defect due to thermal deformation: When the surface of the lens is gazed while bringing a fluorescent lamp into touch with the lens, reflected light of the fluorescent lamp is distorted.
② Defective curing: A large proportion of the monomer is not polymerized, and a shading appears on the lens when the lens is wiped with acetone.
③ Defective shape: The surface shape of the film is obviously abnormal.
(7) Adhesion: The surface of the lens having the photochromic high molecular weight film laminated thereon was cut on the side of the coated layer by using a cutter knife having a sharp edge to form 100 squares measuring 1mm×1mm. Then, a commercially available cellophane tape (Cellotape, registered trade mark) was stuck thereon and was quickly peeled off to check the peeling state of the coated layer (coating) by eyes. A double circle represents that no square was peeled off, an open circle represents that not less than 90 squares were remaining without peeled off, a triangle represents that 50 to 90 squares were remaining without peeled off, and X represents that not less than 50 squares were peeled off.
(8) Thickness of the photochromic high molecular weight layer: The thickness of the film was measured by using a thin film-measuring apparatus manufactured by Filmetrics Co. The film thickness was measured along a line that passes through the center of the substrate while dividing the distance between the center and 5 mm on the inside of the peripheral edge into five equal segments, i.e., was measured at a total of 6 points including a center point, a point 5 mm on the inside from the peripheral edge, and 4 points equally divided therebetween, in order to find $W_{av}$ and $\Delta W/W_{av}$. Table 3 illustrates the results.

In Table 3, $\Delta W/W_{av}$ represents { $(\Delta W/W_{av})\times 100$} in percent between those found based on both $W_{max}$ and $W_{min}$ whichever is larger. When the photochromic high molecular weight layer contains wrinkles to a degree that can be confirmed by eyes or when the photochromic high molecular weight film has not been cured to a sufficient degree, the measurement cannot be taken by using the above apparatus.
(9) Optical properties: A difference in the spherical refractive power of the lens was measured before the photochromic high molecular weight film was laminated and after it was laminated by using a reflection-type curvature measuring machine FOCOVISION SR-1 manufactured by Automation & and Robotics Co. A double circle represents a difference of smaller than ±0.03 diopters, an open circle represents a difference of not smaller than ±0.03 diopters but smaller than ±0.1 diopters, a triangle represents a difference of not smaller than ±0.1 diopters but smaller than ±0.5 diopters, and X represents a difference of not smaller than ±0.5 diopters. The smaller the difference, the smaller a change in the optical properties of the lens before and after the formation of the photochromic high molecular weight film. When the photochromic high molecular weight layer contains wrinkles to a degree that can be confirmed by eyes or when the photochromic high molecular weight film has not been cured to a sufficient degree, the measurement cannot be taken by using the above apparatus.

Examples 2 to 6

Lens samples having a photochromic high molecular weight film were prepared by the same method as the one of Example 1 but blending the polymerizable monomers as shown in Table 1 below and varying the irradiation conditions from those of Example 1 as shown in Table 2. Properties were evaluated as shown in Table 3. The results were as shown in Table 3.

Comparative Examples 1 to 3

Lens samples having a photochromic high molecular weight film were prepared by the same method as the one of Example 1 but blending the polymerizable monomers as shown in Table 1 below and varying the irradiation conditions from those of Example 1 as shown in Table 2. Properties were evaluated as shown in Table 3. The results were as shown in Table 3.

The samples correspond to the laminated material of the present invention except optical properties which are evaluated to be X as shown in Table 3. When Example 1 in Table 3 is compared with Comparative Examples, the temperature on the surface of the lens becomes too high in Comparative Example 1 when the lens is irradiated with light developing a defect due to thermal deformation and causing the photochromic high molecular weight film and the substrate to be deformed. In Comparative Example 2 without using the ultraviolet ray cut filter of the invention, the polymerization is promoted on the surface only leaving, however, the rate of polymerization in the interior behind. Therefore, wrinkles are formed on the surface. In Comparative Example 3 without using the phosphorus-containing photopolymerization initiator, the surface only is polymerized to a small extent but the interior remains unpolymerized, causing a defective curing.

TABLE 1

| No. | Radically polymerizable monomers (parts by weight) | Photochromic compound (parts) | Amine compound (parts) | Photopolymerization initiator (parts) | Stabilizer (parts) |
|---|---|---|---|---|---|
| Ex.1 | M1/M2/M3/M4/M5/M8 43/15/15/10/10/7 | PC1 3 | NMDEA 3 | IN1/IN2 0.375/0.125 | LS765 5 |
| Ex.2 | M1/M2/M3/M4/M5/M8 43/15/15/10/10/7 | PC1/PC2/PC3/PC4 2.7/1.5/0.3/0.3 | NMDEA 3 | IN1/IN2 0.375/0.125 | LS765 5 |
| Ex.3 | M1/M2/M5/M6/M7 40/25/10/10/15 | PC1/PC2/PC3/PC4 2.7/1.5/0.3/0.3 | NMDEA 3 | IN1/IN2 0.375/0.125 | LS765 5 |
| Ex.4 | M23/M5 50/50 | PC2 10 | — | IN1/IN2 0.375/0.125 | LS765 5 |
| Ex.5 | M1/M2/M3/M4/M5/M8 43/15/15/10/10/7 | PC1 3 | NMDEA 3 | IN2 0.4 | LS765 5 |
| Ex.6 | M1/M2/M3/M4/M5/M8 43/15/15/10/10/7 | PC1 3 | NMDEA 3 | IN2 3 | LS765 5 |
| Comp. Ex.1 | M1/M2/M3/M4/M5/M8 43/15/15/10/10/7 | PC1 3 | NMDEA 3 | IN1/IN2 0.375/0.125 | LS765 5 |
| Comp. Ex.2 | M1/M2/M3/M4/M5/M8 43/15/15/10/10/7 | PC1 3 | NMDEA 3 | IN1/IN2 0.375/0.125 | LS765 5 |
| Comp. Ex.3 | M1/M2/M3/M4/M5/M8 43/15/15/10/10/7 | PC1 3 | NMDEA 3 | IN1 0.4 | LS765 5 |

TABLE 2

| No. | Lens material | Source of light | 405 nm irradiation intensity on the lens surface (mW/cm$^2$) | Irradiation time (min) | UV cut filter | Heat ray cut filter | Temperature on lens surface after photocured (° C.) |
|---|---|---|---|---|---|---|---|
| Ex.1 | MR | electrode-less D bulb | 80 | 2 | hard soda glass | — | 80 |
| Ex.2 | MR | electrode-less D bulb | 80 | 2 | hard soda glass | — | 80 |
| Ex.3 | CR39 | electrode-less D bulb | 80 | 4 | hard soda glass | cold filter | 70 |
| Ex.4 | MR | metal halide | 50 | 8 | hard soda glass | — | 80 |
| Ex.5 | MR | electrode-less D bulb | 80 | 2 | hard soda glass | — | 80 |
| Ex.6 | MR | pzpne-less hi-pressure mercury lamp | 80 | 2 | hard soda glass | — | 80 |
| Comp. Ex.1 | MR | electrode-less D bulb | 150 | 1 | hard soda glass | — | 130 |
| Comp. Ex.2 | MR | electrode-less D bulb | 80 | 2 | — | — | 80 |
| Comp. Ex.3 | MR | electrode-less D bulb | 80 | 2 | hard soda glass | — | 80 |

TABLE 3

| No. | Color density (Abs) | Fading rate (min) | Color tone | Durability (%) | Yellowness Y1 | Appearance | Adhesion | Film thickness $W_{av}$ (μm) | $\Delta W/W_{av}$ (%) | Optical Property |
|---|---|---|---|---|---|---|---|---|---|---|
| Ex.1 | 0.9 | 1.1 | blue | 55 | 14 | ○ | ◉ | 40 | 2.5 | ◉ |
| Ex.2 | 0.77 | 1.2 | grey | 45 | 13 | ○ | ◉ | 42 | 2.4 | ◉ |
| Ex.3 | 0.80 | 1.1 | grey | 50 | 13 | ○ | ◉ | 45 | 2.9 | ◉ |
| Ex.4 | 1.02 | 1.9 | orange | 30 | 23 | ○ | ○ | 19 | 2.6 | ○ |
| Ex.5 | 0.67 | 1.6 | blue | 48 | 14 | ○ | ○ | 41 | 1.9 | ○ |
| Ex.6 | 0.50 | 1.7 | blue | 10 | 30 | ○ | ○ | 42 | 2.0 | ○ |
| Comp. Ex.1 | 0.9 | 1.3 | blue | 48 | 14 | thermally deformed | Δ | 38 | 2.1 | X |
| Comp. Ex.2 | A | A | blue | A | A | defective shape, surface wrinkles | X | A | A | X |
| Comp. Ex.3 | A | A | blue | A | A | poorly cured | X | A | A | X |

A: could not be measured

The production method of the present invention makes it possible to form a homogeneous and thin film containing a photochromic compound at a high concentration and having a uniform thickness on the substrate having a curved surface, such as a spectacle lens that is generally available, and to impart photochromic properties while maintaining excellent mechanical and optical properties of the substrate.

Further, the laminate of the invention obtained by the above method not only exhibits excellent photochromic properties but also has a photochromic coated layer that features a smaller thickness, better uniformity in the film thickness and higher homogeneity of properties than those of the conventional photochromic layers. Further, the photopolymerizable and curable composition preferably used in the production method of the present invention can be polymerized and cured in short periods of time in a gaseous atmosphere (i.e., in the open system) by being applied onto the surface of the substrate without using the mold, even when the oxygen gas is contained in small amounts in the atmosphere or even when the photochromic compound that absorbs light used for the polymerization is contained at a high concentration, by suitably adjusting the wavelength profile of light that is irradiated.

The invention claimed is:

1. A method of producing a laminate comprising a substrate having curved surfaces and a photochromic film thereon, said film having a thickness of 20 to 50 μm and containing a photochromic compound in a concentration of 2 to 7% by weight, the method comprising the steps of:
preparing the substrate;
applying a photocurable composition having a viscosity (25° C.) of 60 to 200 cp and containing a photopolymerizable monomer, the photochromic compound and a phosphorus-containing photopolymerization initiator onto the curved surfaces of said substrate by a spin-coating method; and
curing said photocurable composition to form the photochromic film by irradiation with an active energy ray having a relative intensity profile of 25 to 50% of wavelength components of not shorter than 400 nm but not longer than 500 nm, 50 to 75% of wavelength components of not shorter than 300 nm but shorter than 400 nm, and 0 to 5% of wavelength components of not shorter than 200 nm but shorter than 300 nm while maintaining said substrate at a temperature not higher than 80° C., wherein an intensity of the active energy ray falling on the substrate is not larger than 30 mW/cm$^2$ at a wavelength of 315 nm, 30 to 90 mW/cm$^2$ at a wavelength of 365 nm, and 50 to 200 mW/cm$^2$ at a wavelength of 405 nm.

2. The method of producing a laminate according to claim 1, wherein said photocurable composition comprises (A) a radically polymerizable monomer as the photopolymerizable monomer, (B) the photochromic compound and (C) a photopolymerization initiator component, wherein said phosphorus-containing polymerization initiator is contained as the photopolymerization initiator component (C) in an amount of 0.01 to 10 parts by weight per 100 parts by weight of the radically polymerizable monomer (A).

3. The method of producing a laminate according to claim 2, wherein said photocurable composition further contains, as the photopolymerization initiator component (C), photopolymerization initiators other than the phosphorus-containing photopolymerization initiator in an amount of 0.01 to 10 parts by weight per 100 parts by weight of the radically polymerizable monomer (A).

4. The production method according to claim 1, wherein said photocurable composition is cured in a gaseous atmosphere.

5. The production method according to claim 1, wherein said photocurable composition is irradiated with active energy rays containing ultraviolet rays through a filter that reduces the wavelength components of shorter than 300 nm.

6. The production method according to claim 5, wherein a hard soda glass is used as said filter.

7. The production method according to claim 5, wherein said photocurable composition is irradiated with active energy rays containing ultraviolet rays through said filter and, then, through a heat ray cut filter.

8. The production method according to claim 1, wherein said substrate is a thin substrate having a thickness of not larger than 2 mm at the center of curvature of said curved surface.

9. The production method according to claim 1, wherein a liquid pool of said photocurable composition staying on the peripheral edge portion of the substrate is removed during the spin-coating operation.

10. The production method according to claim 9, wherein said liquid pool of said photocurable composition is removed during spin-coating operation by using a spatula.

11. The production method according to claim 10, wherein said spatula is made of a plastic resin or a rubber having flexibility.

12. The production method according to claim 10, wherein said photocurable composition adhered on side surfaces of said substrate is removed by bringing another spatula into contact with the side surfaces during spin-coating operation.

* * * * *